United States Patent [19]

Huffman et al.

[11] 4,370,723
[45] Jan. 25, 1983

[54] COMPUTERIZED ENERGY MANAGEMENT SYSTEM

[75] Inventors: Stanley S. Huffman, Golden; Alan F. Neel, Lakewood; Christopher A. Swartout; Neil E. Dvorak, both of Denver, all of Colo.

[73] Assignee: Peak Demand Limiters, Inc., Lakewood, Colo.

[21] Appl. No.: 117,381

[22] Filed: Jan. 31, 1980

[51] Int. Cl.³ .................. G05B 15/00; G06F 15/20
[52] U.S. Cl. .............................. 364/483; 307/35
[58] Field of Search ............... 364/493, 483, 492, 418; 307/35, 39, 41, 52, 62; 324/103; 236/1 B

[56] References Cited

U.S. PATENT DOCUMENTS

| | | | |
|---|---|---|---|
| 2,789,197 | 4/1957 | Boehm | 219/20 |
| 3,714,453 | 1/1973 | Dellse et al. | 307/39 |
| 3,862,430 | 1/1975 | Lenhart et al. | 307/35 |
| 3,970,861 | 7/1976 | McCollum | 307/35 |
| 4,064,485 | 12/1977 | Leyde | 364/492 X |
| 4,071,745 | 1/1978 | Hall | 364/104 |
| 4,117,537 | 9/1978 | Muench | 364/492 |
| 4,120,031 | 10/1978 | Kincheloe et al. | 364/483 X |
| 4,125,782 | 11/1978 | Pollnow, Jr. | 307/35 |
| 4,146,923 | 3/1979 | Borkan | 364/483 |
| 4,147,296 | 4/1979 | Spethmann | 236/1 B |
| 4,153,936 | 5/1979 | Schmitz et al. | 364/493 |
| 4,168,491 | 9/1979 | Phillips et al. | 364/492 X |
| 4,204,249 | 5/1980 | Dye et al. | 364/492 X |
| 4,219,860 | 8/1980 | DePuy | 364/483 X |
| 4,253,151 | 2/1981 | Bouve | 364/483 |

*Primary Examiner*—Edward J. Wise
*Attorney, Agent, or Firm*—Bruce G. Klaas

[57] ABSTRACT

A system for controlling electrical energy consumption according to a user-set kilowatt limit and an automatic kilowatt limit calculated in a microprocessor. Power is limited by regulating an electric hot water heater according to a preset program and, if necessary, by lowering room temperatures due to electric heater cut back. The device features a computer-controlled display and simplified keyboard which permits the user to enter only valid data. The device also features program fail, power fail, and static detect circuitry to prevent computer error.

30 Claims, 54 Drawing Figures

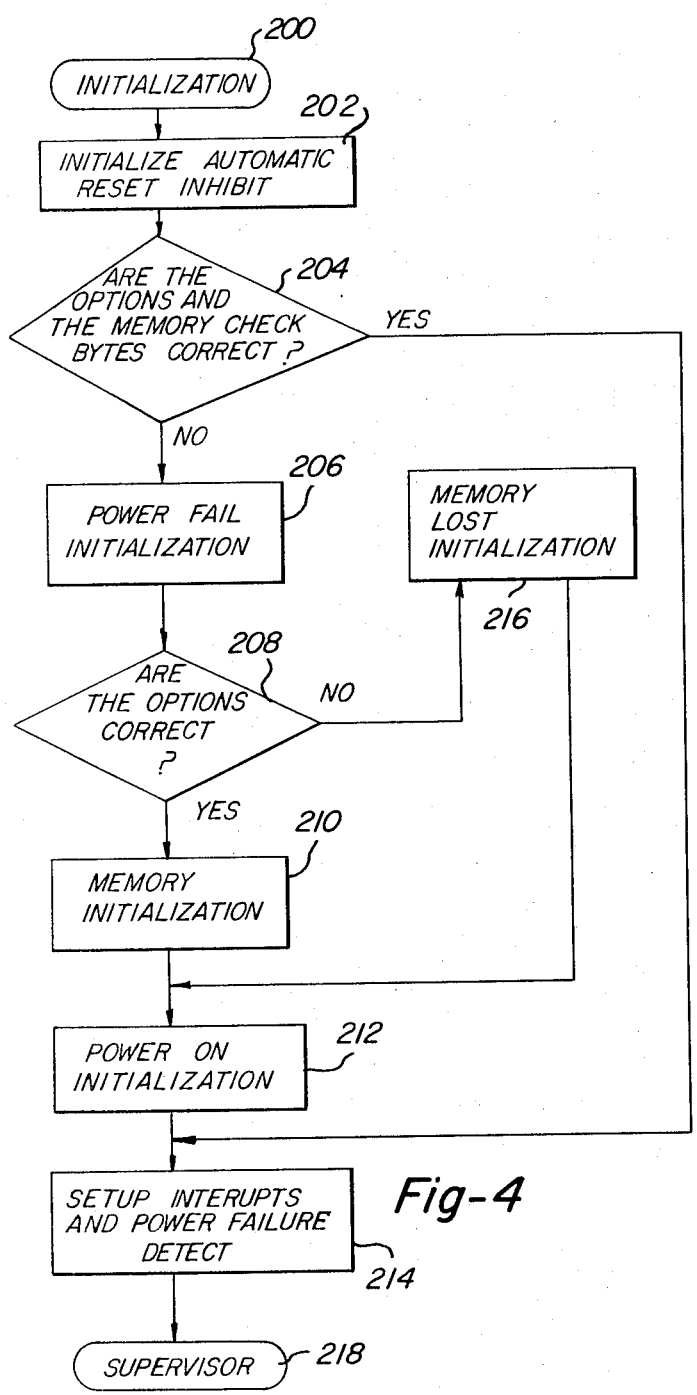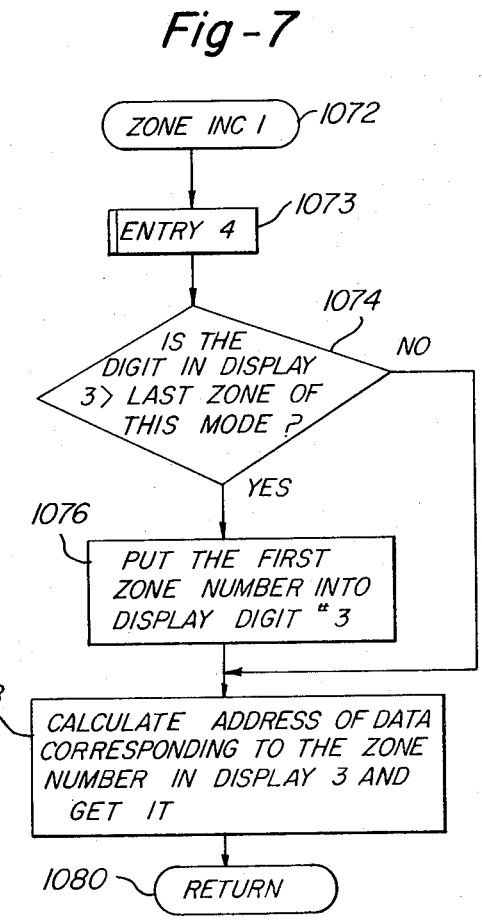

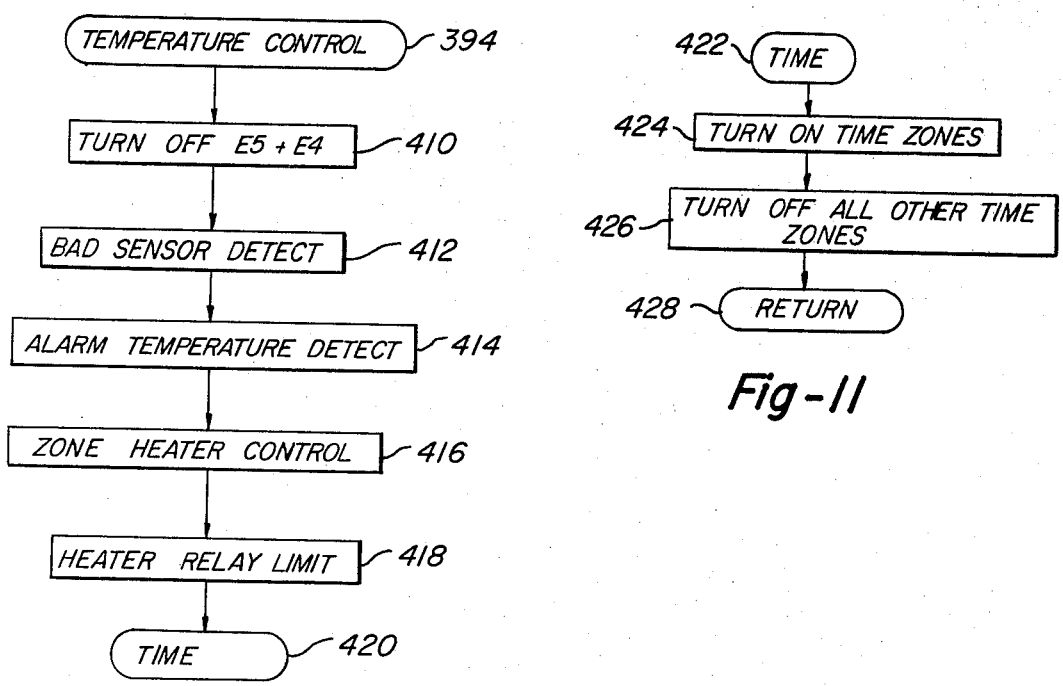
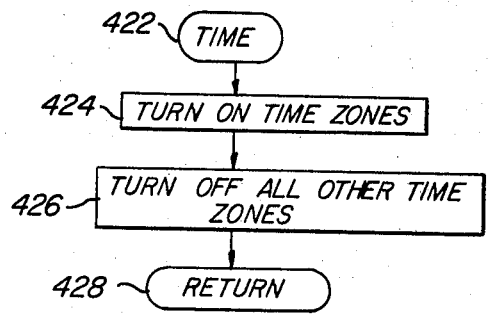
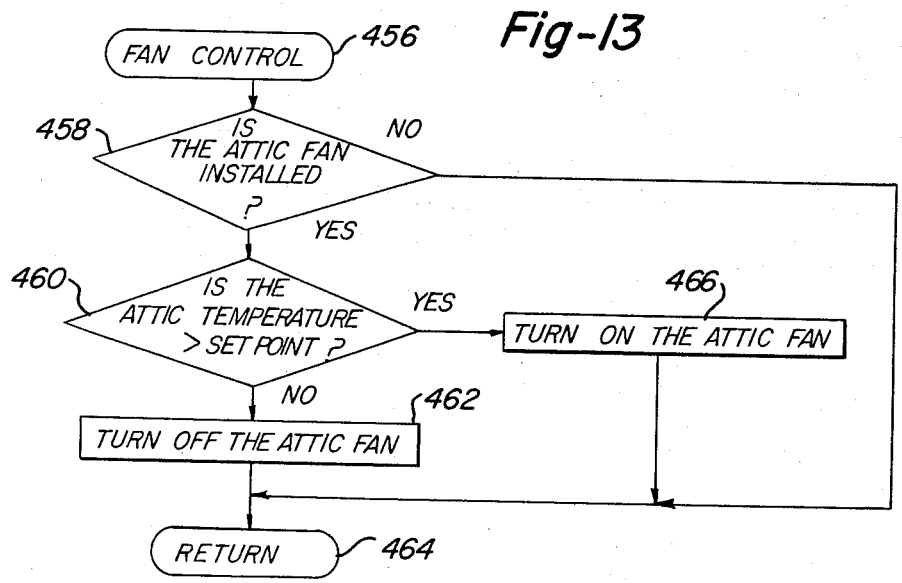

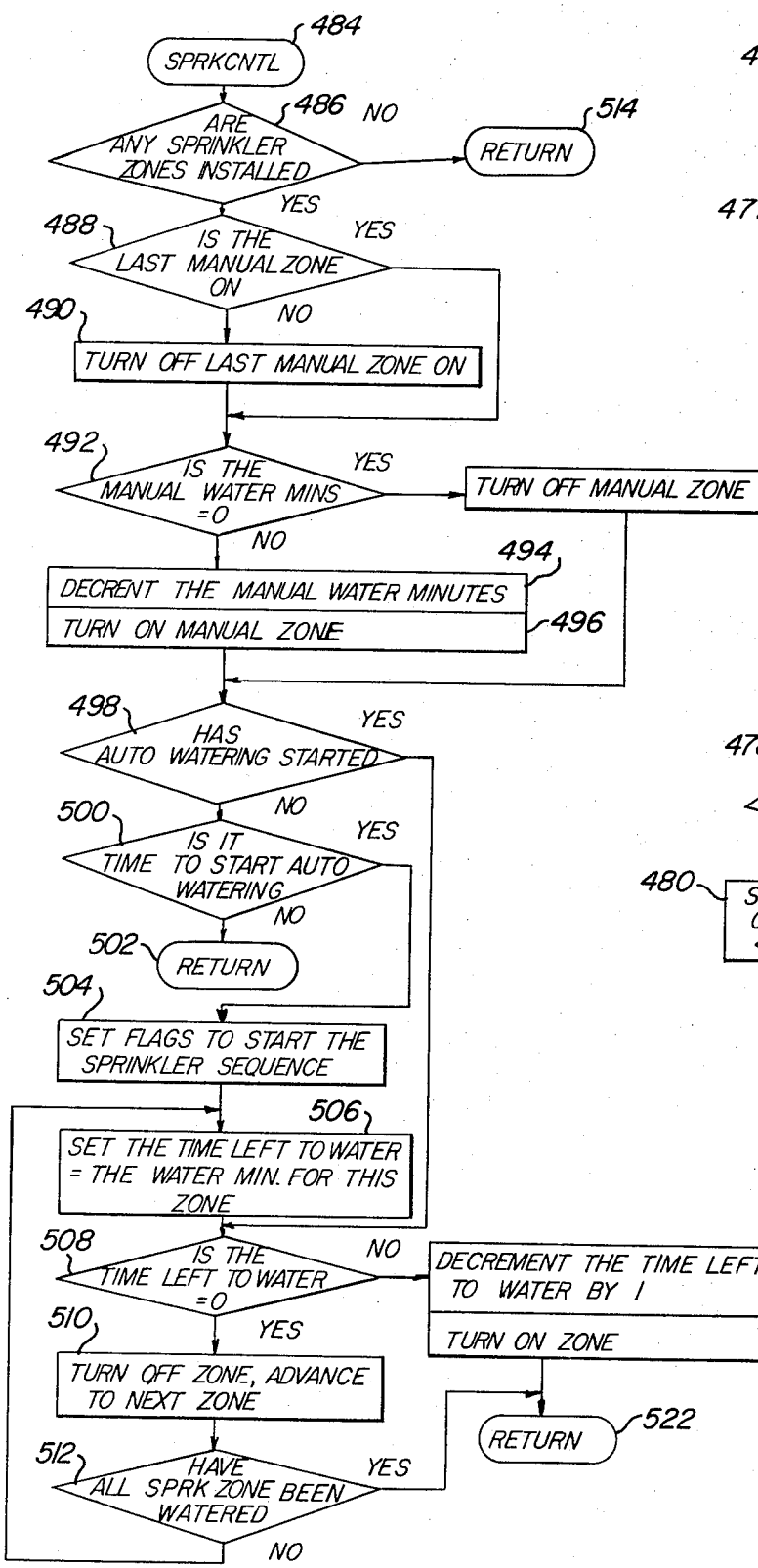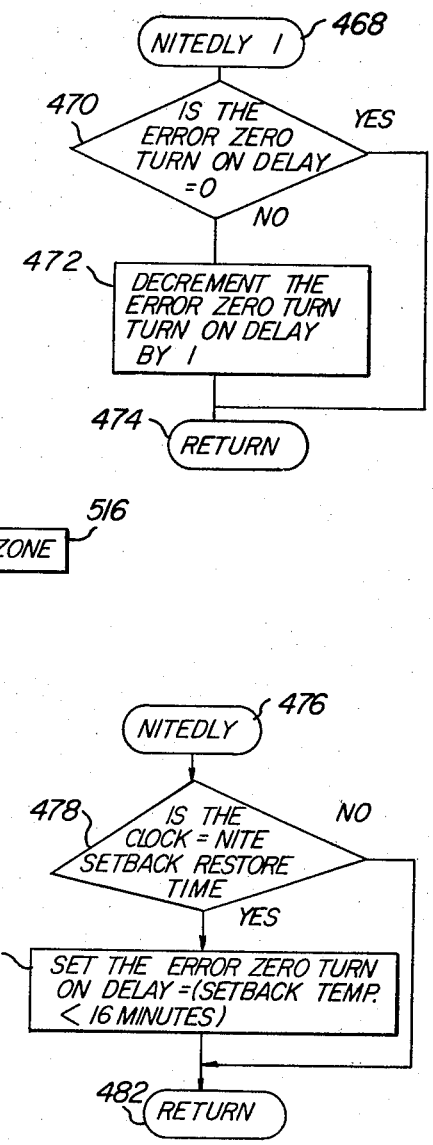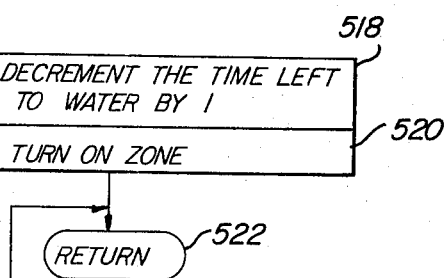

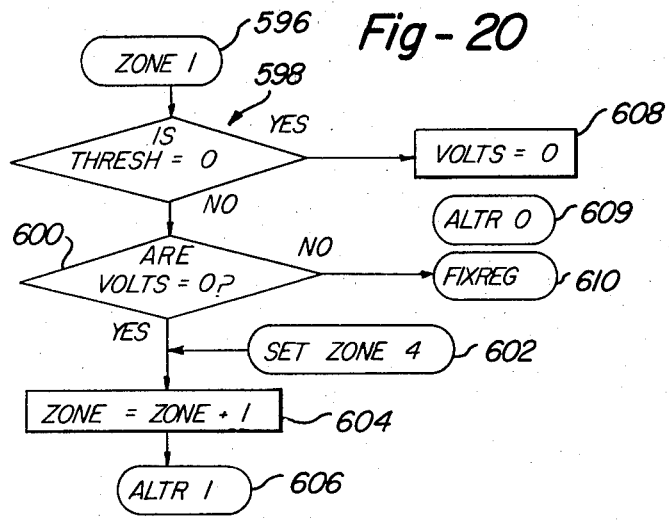
Fig-20
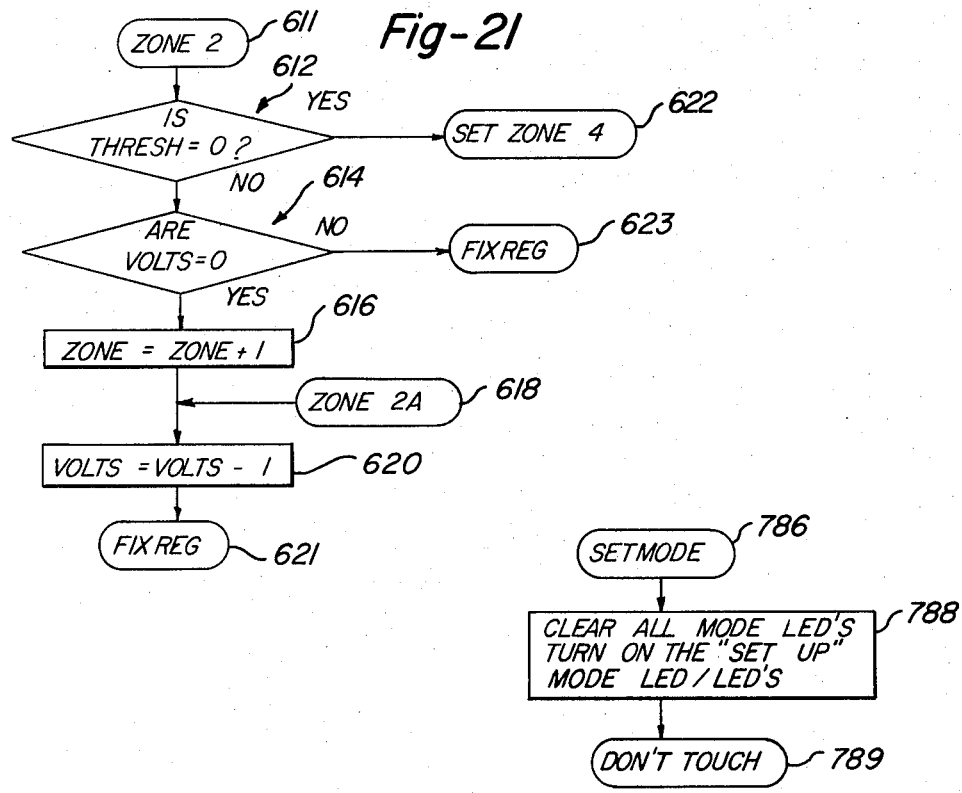
Fig-21
Fig-33

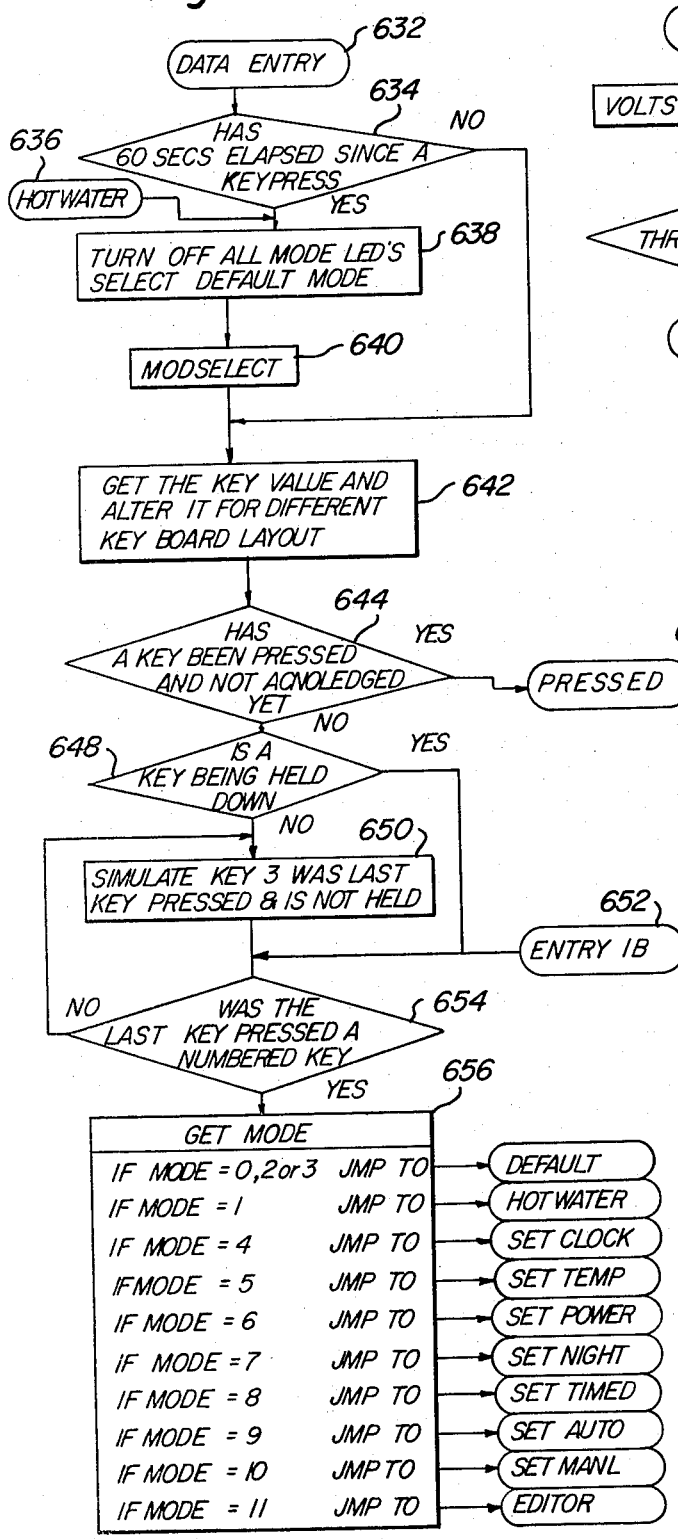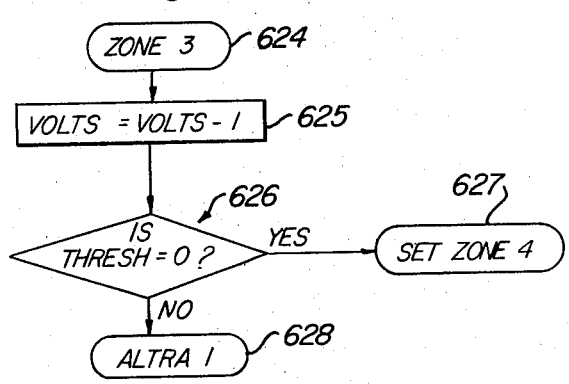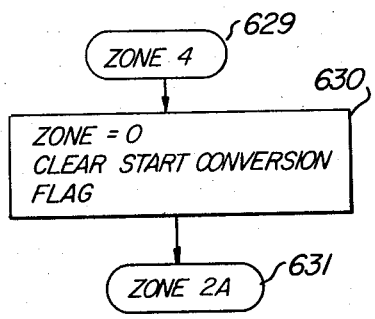

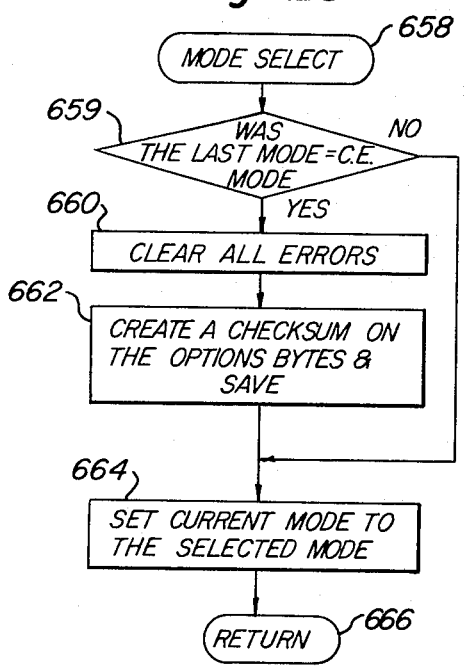
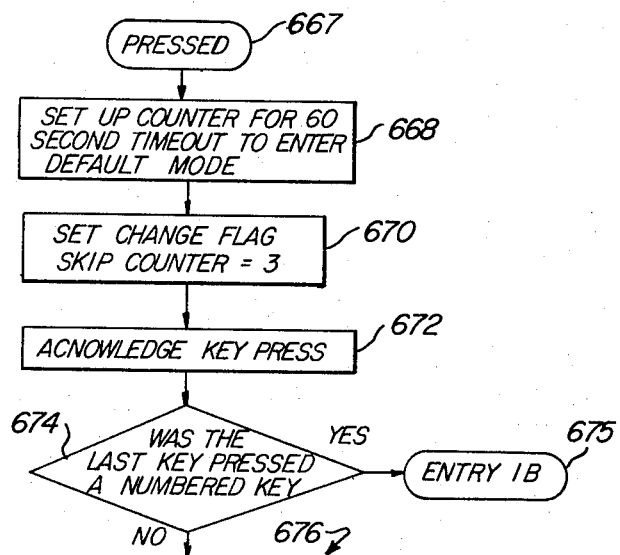
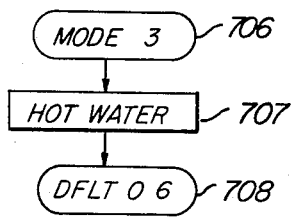
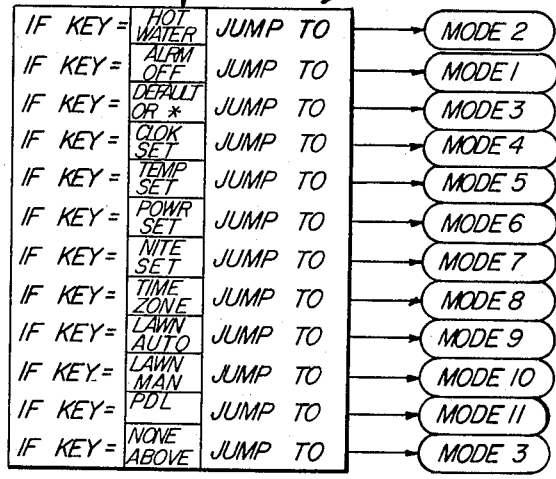

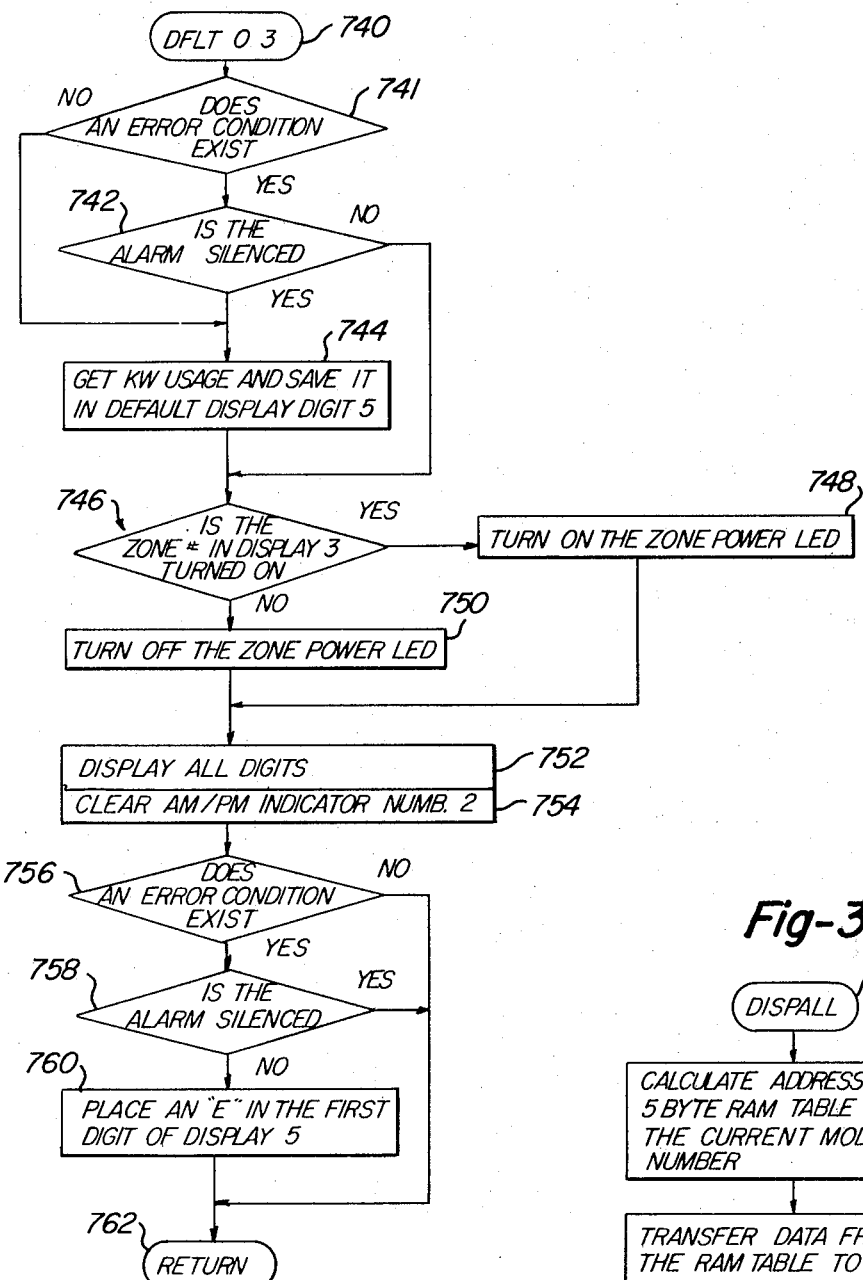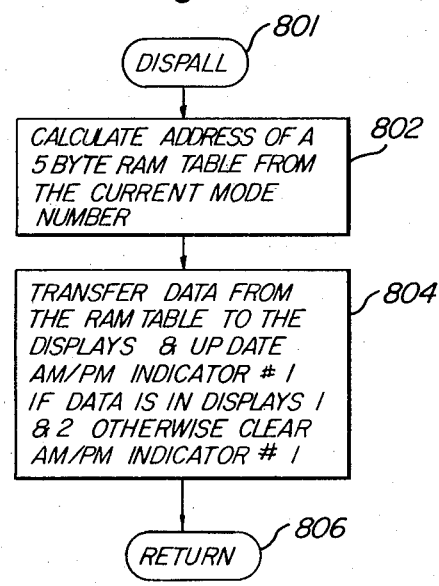

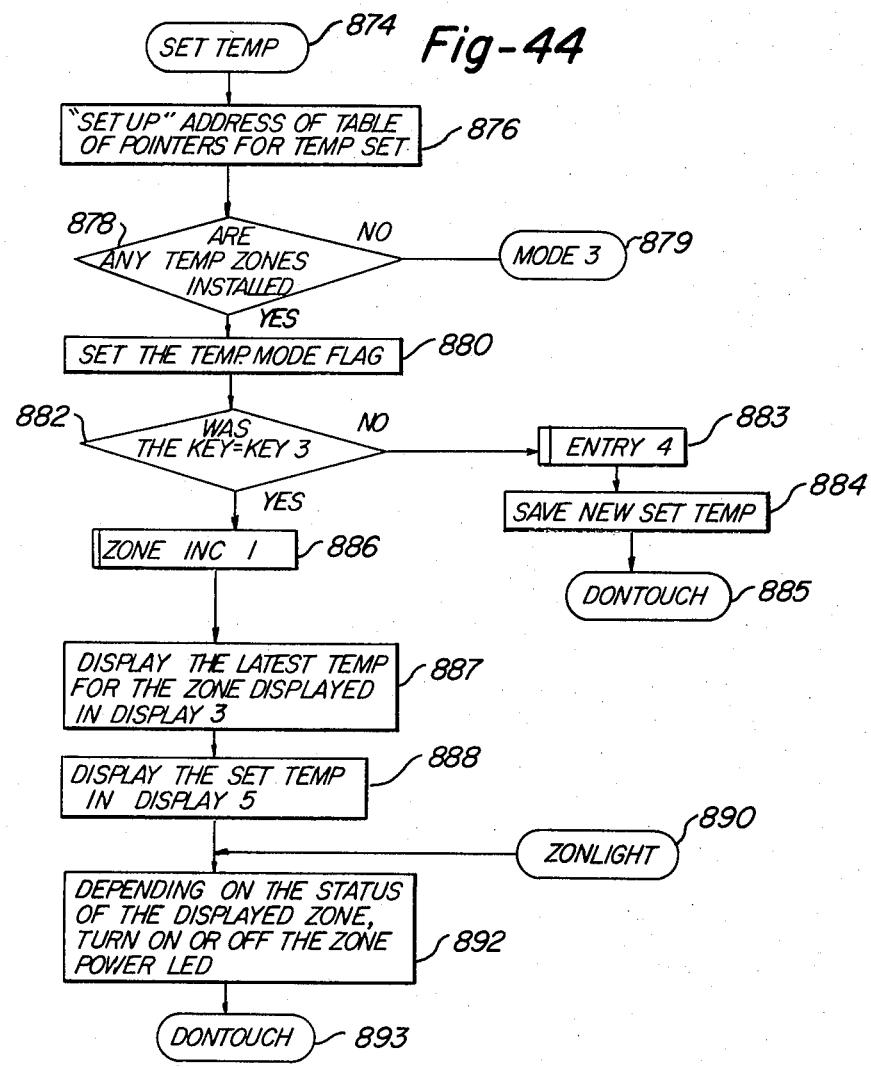
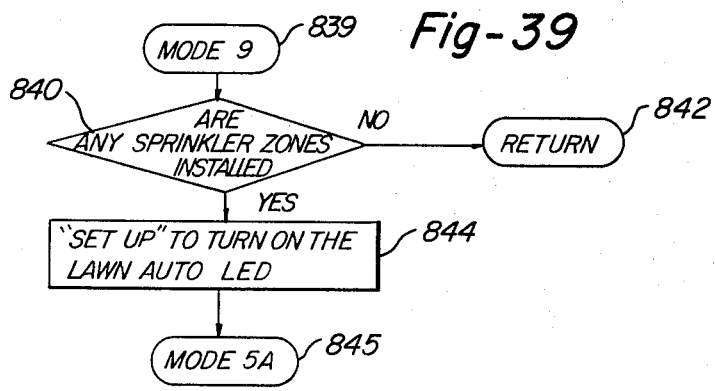

COMPUTERIZED ENERGY MANAGEMENT SYSTEM

BACKGROUND OF THE INVENTION

The present invention relates to control systems for managing electrical power consumption.

The present invention is intended for use in all-electric homes, industrial buildings, and other facilities which are billed by a utility company not only on the basis of total electrical power usage, but on the basis of a peak power usage in a given interval, such as a 15 minute period. In other words, if more than a fixed amount of power, in kilowatts, is used in a 15 minute period, the customer is billed an additional amount. The utility company does this to encourage customers to level out their demand over a 24 hour period to reduce concentrated demands on utility company equipment which can cause black-outs or brown-outs.

A number of prior art devices have been devised to allow customers to level out their power demands.

Lenhart et al., in U.S. Pat. No. 3,862,430, disclose an electrical demand limiting system in which power consumption by a residence or other facility is measured and is compared with a plurality of preselected demand limits, each of which is a percentage of the total permissible power demand. Logic circuitry comprising comparators and flip flops is used to disconnect the various loads.

Deslisle et al., in U.S. Pat. No. 3,714,453, disclose a load regulating system which takes advantage of the thermal inertia of the power company's kvameter to regulate the load closely within power company limits. Certain nonregulated loads can never be dropped. In one mode, loads are dropped and reconnected according to a predetermined, fixed order; in another mode, they are cycled at fixed intervals.

In the device of Spethmann, U.S. Pat. No. 4,147,296, a demand limit controller for reducing a plurality of heating or cooling loads by a proportional amount is disclosed as being amenable to computer control. Each load is controlled through a fluid valve by a resettable temperature controller having inputs from a temperature sensor and a proportional demand controller.

Pollnow in U.S. Pat. No. 4,125,782 discloses a microprocessor-controlled demand controller which determines shed and restore points as a function of the present rate of power consumption. The computer is arranged in a standard form, comprising a CPU, ROM, RAM, and PIA's. A PIA is connected to eight output circuits, each operating a different load. The control panel utilizes thumbwheel switches connected to the unit through input circuits to generate 4 bit BCD digits to the PIA. A priority switch 5 selects a fixed priority mode or a rotating priority mode through a switch circuit. A demand interval is divided into 90 increments and the rate at which power was consumed during the last 9 increments is compared with power consumption over the entire demand interval. If power consumption is rising slowly toward the demand objective, loads are shed at a later time than if power consumption is rising rapidly.

Hall, in U.S. Pat. No. 4,071,745, discloses an electronic system for controlling a measured temperature in a house or other building according to various time intervals. The system utilizes a microcomputer but is not connected to power input. The device saves energy by temperature setback and by reduction of the degree of control of the temperature. Data entry is accomplished by data entry switches, function switches, and mode switches. Temperature is input through a transducer. Preferably, there are 24 possible time intervals. During each interval the temperature measured by the transducer is repeatedly compared with a stored reference temperature to generate appropriate control signals for the cooling and heating systems.

SUMMARY OF THE INVENTION

The present invention provides a computerized energy management system which operates efficiently to monitor a plurality of discrete loads with a minimum of user input. The system essentially comprises a power sensing circuit for measuring power consumption in the residence, building, or other facility being monitored; a computer inputting this data as well as user entered data, the user entered data comprising a power demand limit for the facility and selected a maximum output level from various loads in various zones, e.g. a temperature setting for a room wherein a load is placed which is an electric zone heater; output sensors, e.g. electronic thermometers, placed in rooms wherein demand is to be monitored and connected to the computer; a keyboard, connected to the computer for entering data; and a display for displaying data. The computer operates as follows: Power consumption is compared with the power demand limit; if the demand limit is exceeded, a selected maximum output level, which may or may not be user selected, e.g. a room temperature setting or a hot water heater which has an external power setting, is reduced. If after a certain time, e.g. two seconds, power consumption is still above the power demand limit, other selected maximum output levels in various zones, e.g. room temperature settings, are reduced. If, after a certain time, power consumption is still above the power demand limit, the selected maximum output levels previously reduced are reduced further. The initial maximum output levels are reduced to limited maximum output levels a preselected amount below the initial maximum output levels. Preferably, the room temperature settings are reduced in one half degree F. increments and the hot water heater is limited to twenty five percent output.

The present invention further resides in various ways in which user input is minimized. The keyboard and display are computer-controlled so that the user can only select from a "menu" of computer generated values to be entered as the power demand limit, the selected maximum output levels, etc. The computer is in turn controlled by fail safe circuitry which detects program fail and resets the computer in this event and also in the event of a static discharge or power flicker. The computer also calculates an automatic power demand light based on previous power demand so that power is limited even if the user neglects to alter the power demand limit to account for seasonal changes. Furthermore, in the event of a power failure, program data is saved by a battery powered memory. An alarm warns the user of excess power usage, power failure, and other conditions.

BRIEF DESCRIPTION OF THE DRAWING

FIGS. 4-54 are flow charts of software for use in the present invention.

DESCRIPTION OF THE PREFERRED EMBODIMENT

Figure 1:
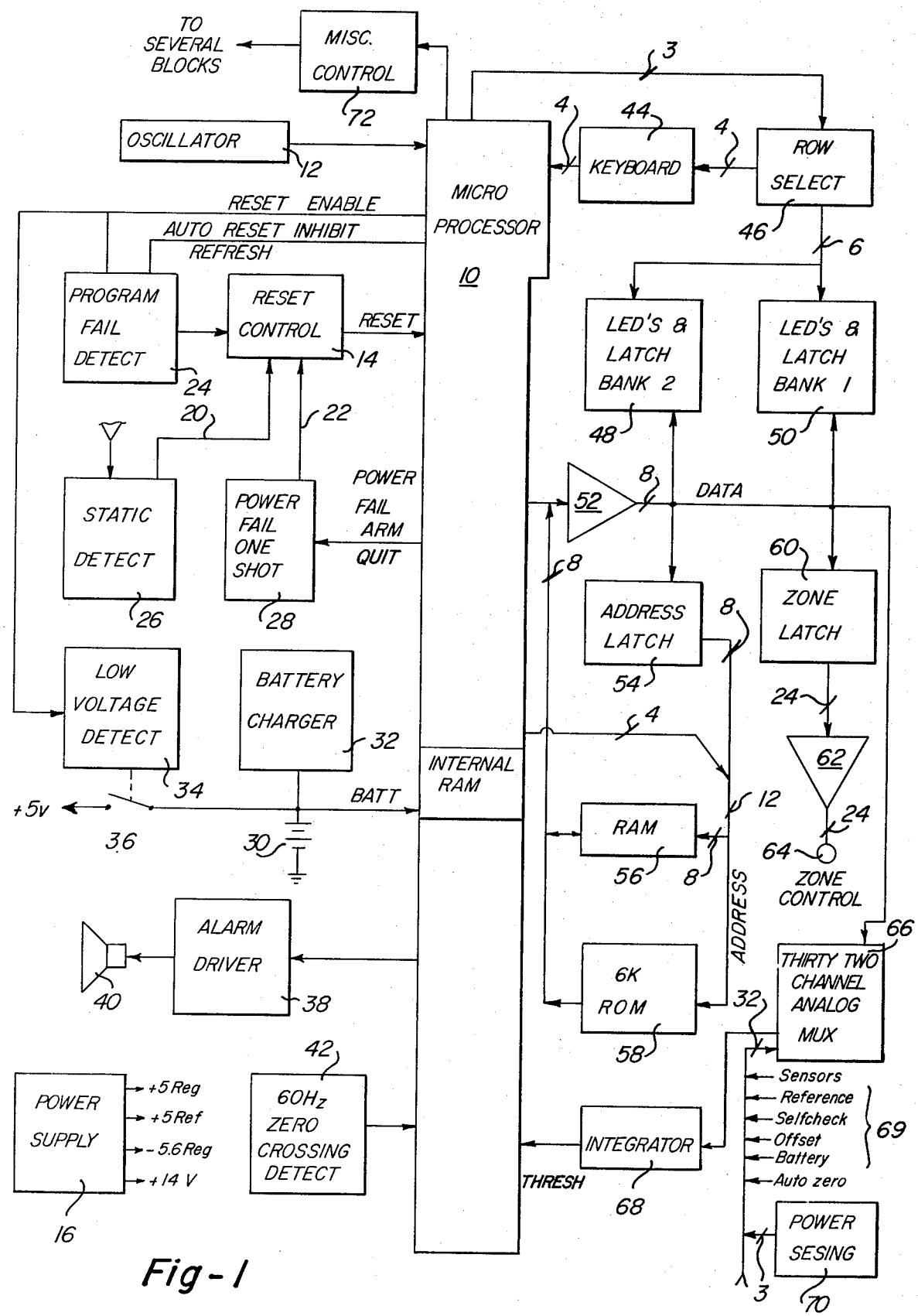
FIG. 1 is a block diagram of an apparatus of the present invention.

Referring now to FIG. 1, blocks connected by more than one line are shown as a single line with a slash marked by having a number indicating the number of connecting lines. The present apparatus may be seen to be controlled by a microprocessor 10, which has some read/write memory internal to it, such as an 8035 manufactured by Intel and others.

An oscillator 12 provides all clock (timing) signals required by the microprocessor cpu, namely two phase-shifted 5.5296 MHz signals. These frequencies provide AC rejection at the analog to digital (AD) converter. The reset control 14, static detect 26, power fail one shot 28, program fail detect 24, low voltage detect 34, and relay 36 are described in detail in connection with FIG. 2. Briefly, a reset control 14 provides the following functions: At power-on to the apparatus, it provides a time delay to allow a standard DC power supply 16 to stabilize; and it provides reset to the processor when signalled by inputs from the program fail detect 24, the static detect 26, and the power fail one shot 28. In a reset condition, the microprocessor stops executing its program and returns to initialization, block 200, FIG. 4.

The power supply 16 comprises a low voltage transformer installed on the power lines to the building, residence, or other facility for which energy is to be managed by the present system.

The program fail detect 24 is a hardware device which is designed to receive a special sequence of signals output from the microprocessor 10 on an AUTO RESET INHIBIT REFRESH line. The program fail detect 24 also receives an enable signal on a RESET ENABLE line from the microprocessor 10. This disables the program fail detect until the program begins to run and to provide the sequence necessary to prevent a program fail detect signal, as is known in the art.

The static detect 26 prevents voltage spikes on any signal lines, e.g. address lines, from causing a program failure. Voltage spikes may come from someone touching the device, lightning, or anything causing a voltage wave to travel across the p.c. board. An antenna, essentially a short length of wire, is connected to the static detect 26 and detects a fast voltage change, rise or fall. Upon detection of a fast voltage change, a reset pulse is sent through line 20 to the reset control 14 to shut the microprocessor off for about two msec., until the pulse is dissipated, at which point the processor comes back on.

The power fail one shot 28 resets the microprocessor because of a power failure, while permitting certain parts of external memory in RAM 56 to be saved in internal memory in the microprocessor 10. A 60 Hz zero crossing detect 42, input to the microprocessor, detects the absence of a 60 Hz input voltage and triggers the one shot 28 through a POWER FAIL ARM line going from the microprocessor to the one shot. The one shot 28 is connected to the reset control 14 through line 22 and holds the microprocessor 10 reset for a minimum of one full second before it releases the RESET line. The one second delay ensures that, after a brief power flicker, power has restabilized before the microprocessor is turned back on.

While power is off, the microprocessor is supplied with 5 V from a battery 30, four penlight AA batteries, which holds logic levels in the internal memory of the microprocessor to retain memory transferred there on signal from the zero crossing detect 42. The battery 30 will save memory for up to two days.

A battery charger 32 maintains the battery in a fully charged condition. It is powered by the power supply 16, and comprises a conventional diode-resistor circuit.

A low voltage detect 34 controls a relay 36 on the +14 line. The voltage detect senses instability in the +14 line from the power supply 16 to the Vcc pin of the microprocessor. This instability closes a relay 36, which is in the form of a transistor switching circuit allowing current to flow from the battery 30 to all 5 V circuits served by the power supply 16, which powers all logic circuits. The low voltage detect 34 senses voltages above or below the specified 5 V level in the +14 line before the zero crossing detect 42 senses absence of power. The low voltage detect, in effect, senses an impending power failure, presaged by power instability, to place the battery 30 on line with the microprocessor 10 and the +5 line of the power supply 16.

The foregoing elements of the block diagram of FIG. 1 work together as follows: Voltage instability triggers the low voltage detect 34, which closes the relay 36 for power from the battery 30 to +5 lines and internal RAM; the program detects power failure from the zero crossing detect 42; the program (described below) then removes information from RAM 56 and places it in internal memory; the program then arms the Power Fail One Shot 28; the program then simulates program fail by discontinuing the sequence which enables the program fail detect 24 through the AUTO RESET INHIBIT REFRESH line; the program fail detect 24 gives a reset command to the reset control 14 which causes the processor to reset; the RESET ENABLE line is then disabled, which signals the low voltage detect circuit 34, connected to the RESET ENABLE line to open the relay 36, which disconnects the battery from everything but the microprocessor 10.

An alarm driver 38 is controlled by the microprocessor 10 and connected to a speaker 40 to provide an audible alarm. Two transistors in the alarm driver 38 are used to provide two different audible alarms, a sharp piercing "hard" alarm, and a softer, pulsating "soft" alarm, in response to different computer-generated signals, as discussed below.

The zero crossing detect 42 is built around a comparator connected to the microprocessor 10 in order to sense the zero crossing of AC line voltage to the building. It sends a 60 Hz pulse train to pin INT of the 8035 microprocessor. In addition to its reset function, the zero crossing detect 42 sends zero crossing information to the microprocessor 10 to use as timing signals for the real time clock and for miscellaneous control functions discussed under software.

Figure 3:
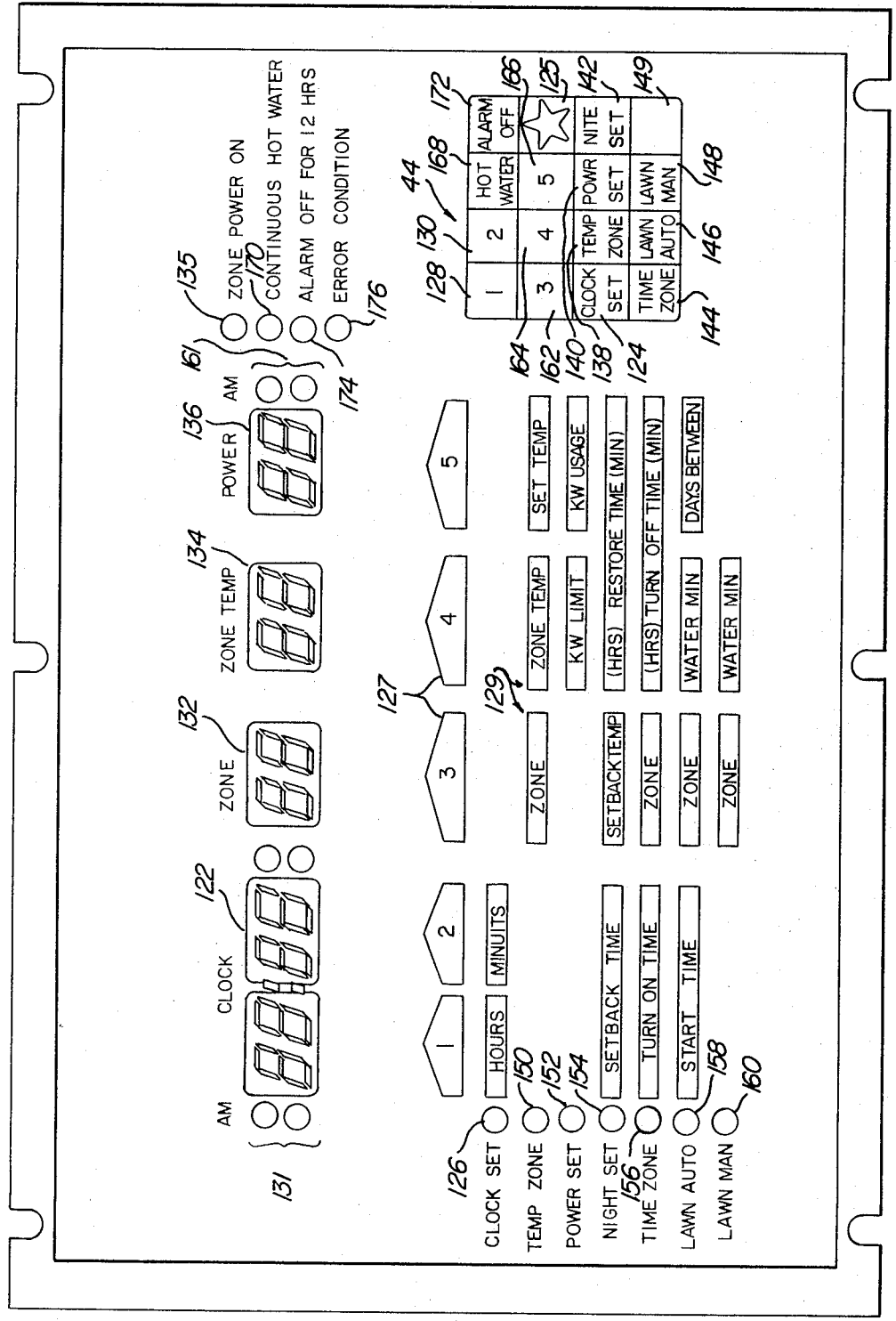
FIG. 3 is a front view of display and keyboard portions of the present invention.

The keyboard 44 is a standard 4×4 keypad, as shown in FIG. 3, connected through four lines to inputs P24-P27 of the 8035 as indicated in the drawing by the reference number 4. It is scanned by a row select 46, comprising a 7442 decoder controlled from pins P14-P16 of the 8035 connected to inputs A-C, D being grounded. The 7442 is connected to the keyboard through outputs 1-4.

The row select 46 selects a particular row in the keyboard 44. A particular key in that row will produce an output on one of the lines P24-P27 from the keyboard 44 to the microprocessor depending on the column in which the key is located. The row select then energizes the next row, and the next, etc., so that the entire keyboard is read sequentially, row by row.

Outputs 1-6 of the row select 46 are connected to LED's and latch banks No. 1 and No. 2, 48, 50, together comprising ten HP 5082-7751 alphanumeric displays each receiving an input from the row select 46 through a transistor biased by the row select. Outputs 1-4 from the row select are input to the dp pin of a pair of displays, outputs 5 and 6 being input to dp pins on separate displays, and also to individual LED's indicating AM, PM, ZONE POWER ON, CLOCK SET, etc. as shown in FIG. 3.

The LED and latch banks No. 1 and No. 2, 48, 50 together make up the total LED display shown in FIG. 3, each LED or alphanumeric display being connected to the row select 46, as stated. Each LED and each of the eight LED's in each alphanumeric display is also connected to latch circuitry in each bank. The latch circuitry comprises, for each bank, a pair of 74LS75 latches receiving inputs from microprocessor data lines D0–D7 and outputting through buffers to the LED's. The latches function in a conventional manner to continuously energize a particular LED on a single signal from the microprocessor so that the same display will be shown until changed by the microprocessor. A plurality of LED's is connected in series to each latch output, a particular LED being energized by sequential selection by the row select 46. As the row select scans keyboard rows, it also scans the array of individual LED's and each alphanumeric display in effect producing a display which flashes, albeit at a rate normally imperceptible to the human eye.

The latches in LED and latch banks No. 1 and No. 2, 48, 50 are connected on data lines D0–D7 to the microcomputer 10 through a buffer 52, essentially a 74LS04 for each data line, which ensures that pulses on the data lines D0–D7 have sufficient power to reach the banks 48, 50, an address latch 54, zone latches 60 and a multiplexer 66.

The address latch 54, a pair of 74LS75 latches, receives data from lines D0–D7 and also inputs from microprocessor pin ALE for the strobe. The address latch 54 demultiplexes addressing from the microprocessor. Outputs from the address latch 54, lines A0–A7 are input to the RAM 56 and the ROM 58.

The RAM 56 is composed of two 2111-2 memory chips interconnected and connected to the microprocessor 10 in a standard manner through address lines A0–A7. Data lines D0–D3 are connected to one chip and data lines D4–D7 are connected to the other. The RAM 56 stores all data entered through the keyboard 44 and power consumption data from circuits 70. A portion of this data from RAM 56 is transferred to the battery powered read/write memory in the event of a power failure, as previously described.

The ROM 58 comprises up to four separate chips to provide the bytes of memory required. Lines D0–D7 are connected to the data inputs of each chip. Address lines A0–A7 as well as address lines A8–A11 from pins P20–P23 of the microprocessor 10 are connected to each chip. The additional address lines A8–A11 are for addressing and chip selection. The ROM 58 stores the program of the present device.

Zone latches 60 are constructed from six 74LS75 latches, three receiving inputs from lines D0–D3 and three from lines D4–D7. Each latch chip has four outputs, each output going through a buffer 62 to a zone control 64. The latches provide a steady on or off signal to each zone control 64. Each buffer 62 is a single 7406 chip.

Each zone control 64 is a solid state relay utilizing opto-isolation and zero-crossing turn on. The twenty four zone controls 64 are used to turn on or turn off a hot water heater, room heaters, an attic fan, timed outlets, lawn sprinklers, etc., depending on the design of the building in which the present apparatus is utilized. The zone controls are located together in a power unit which receives a 220 V line from a circuit breaker for the building and divides this line into a number of lines for the various outlets, heaters, etc. Each controlled line contains the relay of a zone control, while other lines, such as those to appliances, are not controlled.

The thirty-two channel analog multiplexer 66 is constructed from four 4051 multiplexer chips having their inputs connected to information inputs 69 and power consumption sensing circuits 70. The information inputs 69 comprise the battery check, offset, self check, auto zero, reference inputs, and twenty four temperature sensors. The outputs of the 4051 chips are connected to the integrator 68.

The multiplexer 66 is controlled by the microprocessor 10, which tells the multiplexer which information input 69 to measure or to measure the power sensing circuits 70. The multiplexer selects one or two of the 32 information inputs and puts it into the integrator 68.

The integrator 68 is constructed from a standard op amp/capacitor circuit and a comparator. It outputs to the threshold detect pin of the microprocessor.

The integrator 68, together with the multiplexer 66, performs an AD conversion on analog data coming in through information inputs 69 and power consumption sensing circuits 70. This is done through a conventional dual slope process, described in connection with FIGS. 18–23, using the auto zero from circuits 69.

Information inputs 69 comprise twenty-four temperature sensor inputs, a reference input, a self check input, an offset input, a battery check input, and an auto zero input. The temperature sensor inputs are each provided by an LM334Z current source installed in an area, such as a room or attic, which is to be controlled according to its temperature, with one sensor, as discussed in connection with FIG. 10, outside the building. The temperature sensors are low voltage current units. They measure temperatures in degrees Kelvin, necessitating the offset input which is a steady current input which is of opposite polarity to sub tract an appropriate correction factor from a temperature sensor being read. The reference input is a steady +5 V used, as is known, during dual slope AD conversion. The self check is a steady value provided to ensure that the AD converter is running correctly. The offset, previously mentioned, is a steady 45.973 micro-amps. The battery check input measures the voltage of the battery 32 to see if the battery needs replacing. The auto zero is connected to no input to give a steady zero reading.

The power consumption sensing circuits 70 comprise two current transformers installed on input lines to the building between the power company power meter for the building and the main circuit breaker. A third transformer is also used in 208 VAC three phase circuits. A coil is placed around each service line to measure current in that line. The current in the coil is then amplified by conditioning circuitry (staged op amps) for input to the 4051.

The miscellaneous control circuits 72 provide conventional controls such as a read/write control for RAM 56, address decoding for latches 54, 56 and ROM 58, miscellaneous select signals for the latches, RAM, and ROM and strobes for the latches.

Reset Circuitry

Figure 2:
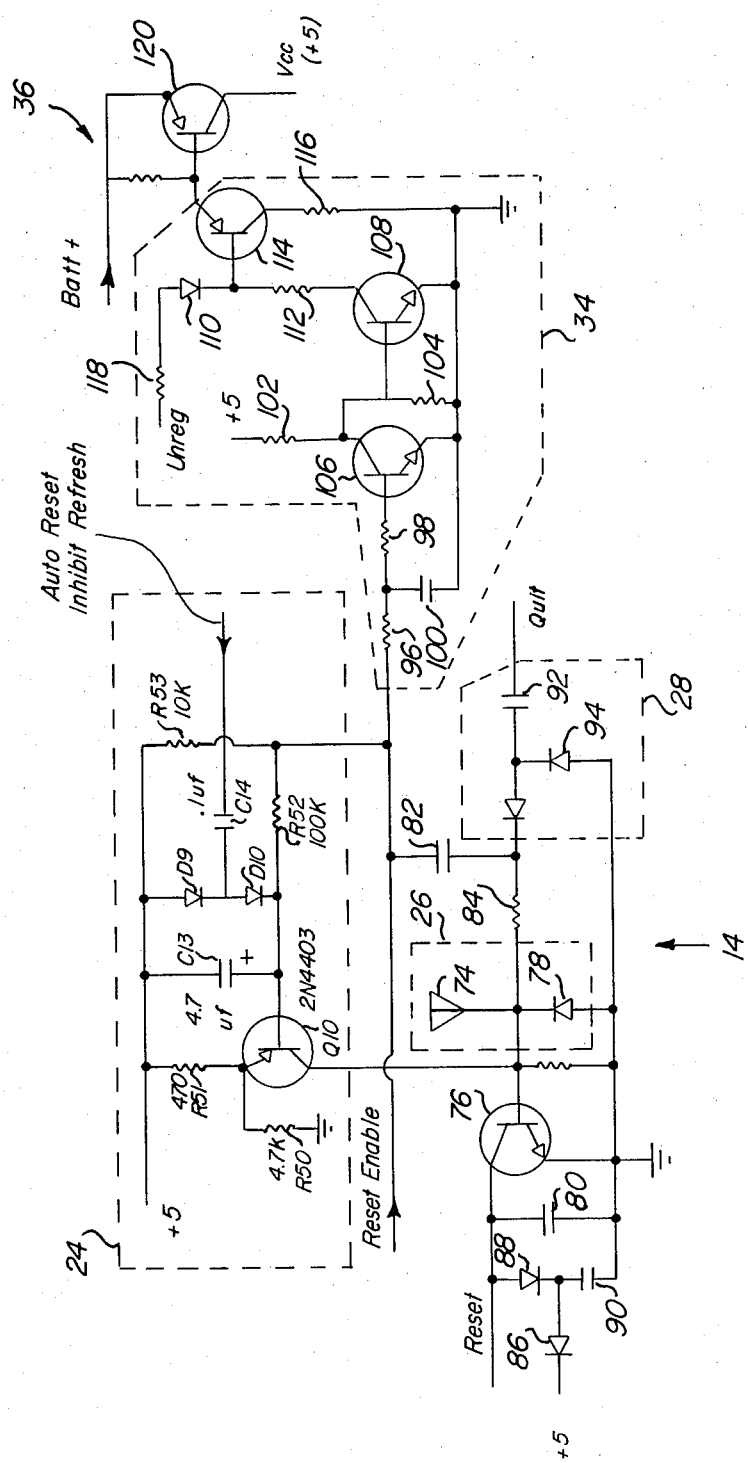
FIG. 2 is schematic diagram of reset circuitry of the present invention.

FIG. 2 shows the particular reset circuitry described in connection with the reset control 14, the program fail detect 24, the static detect 26, the power fail one shot 28, and the low voltage detect 34 and its associated relay 36.

The antenna 74 senses a voltage rise or fall, which is rectified by the base of a transistor 76 and by a diode 78, is amplified by the transistor 76 and pulls the RESET line to ground, discharging capacitor 80. This causes the microprocessor 10 to reset, which in turn causes the RESET ENABLE line from the processor to go to +5 V which passes through capacitor 82 and a resistor 84, which provides positive feedback so that after the static discharge is removed from the antenna, the signal from the ENABLE line continues to reinforce the RESET by going through capacitor 82, resistor 84 to the base of transistor 76 keeping the processor reset until capacitor 82 charges, about two msec., whereupon the base of transistor 76 loses its driving signal, allowing the RESET line to float high, which removes the RESET pulse from the microprocessor and the program begins to execute again.

Diodes 86, 88 and capacitor 90 are part of a conventional power on reset 14.

The power fail one shot 28 holds the processor off while power to the unit is dropping or rising, for example, during a power flicker. The one shot is armed by bringing the QUIT line low, on signal from the microprocessor initiated by failure of the zero crossing detect 42 to provide pulses to microprocessor pin INT. This allows capacitor 92 to charge through diode 94, which takes less than one tenth of a second. After the capacitor 92 is charged, the power fail one shot is armed. When the program stops the square wave signal on the AUTO RESET INHIBIT REFRESH line to block 24, which occurs when the microprocessor senses a power fail or the software fails for any reason.

The square wave AUTO RESET INHIBIT REFRESH passes through capacitor C14, is rectified by diodes D9 and D10, and discharges capacitor C13. This biases transistor Q10 off. When the square wave AUTO RESET INHIBIT REFRESH stops, if the ENABLE line is low, capacitor C13 will charge through resistor R52. This biases transistor Q10 on, causing current to flow into the base of transistor 76, which causes a reset pulse in the RESET line. Resistors R51 and R50 control the biasing point of transistor Q10.

The reset pulse causes the microprocessor 10 to bring the QUIT line high, which causes the capacitor 92 to discharge through diode 94 and resistor 84 which goes to transistor 76 as in the case of a static discharge. Since capacitor 92 is much larger than capacitor 82 (4.7 to 0.001 microfarads), capacitor 92 takes much longer to discharge, causing the microprocessor to be reset for about three seconds.

In the low voltage detect 34, the RESET ENABLE line comes in through a resistor 96, a resistor 98, and a capacitor 100 which act as a delay network. Resistors 102, 104, and transistor 106 act as an amplifier for the ENABLE signal, a transistor 108 acts as a switch to enable the low voltage detect circuit 34, which comprises a diode 110, a resistor 112, transistor 114, resistor 116, and resistor 118.

If the +14 UNREG drops below a predetermined level, transistor 114 begins to conduct, which biases a transistor 120, which closes the circuit from BAT to Vcc +5, powering all digital logic required to operate the microprocessor.

Operation of the Present Apparatus

As stated, the unit is installed by connection of the current probes and power sensing circuits 70 and power supply 16 to the building's power supply lines, installation of the zone controls 64 in the hot water heater, room heaters, outlet wiring, etc. to turn these devices off and on and installation of the temperature sensors in appropriate rooms, attic, outside, etc. At initial installation, the installer places the microprocessor in the installer programming mode by entering a preselected code. The installer might assign zone 1 to the hot water heater, zones 2-7 to temperature controlled rooms, zones 8-11 to timed outlets, sprinkler zones, etc. in a typical installation, according to a preselected code and sequence. The installer then alters or supplys program information in blocks 212, 216, FIG. 4. The installer informs the user what zone numbers correspond to temperature controlled rooms, timed zones, etc.

As shown in FIG. 3, an LED clock 122 is provided in the display. The clock is set by pressing a clock set key 124 on the keyboard 44, lighting clock set indicator 126. As shown by graphics on the display, key one 128 then sets clock hours, and key two 130 sets clock minutes. The graphics are arranged in a matrix fashion, each row indicating the function being set, and various columns in the rows indicating the keys to be pressed (blocks 127) and the function of the key (blocks 129), each column being directly below and corresponding to a particular display. By holding key one 128, clock display 122 hours will cycle through one to twelve and back to one. By holding key two 130, clock display 122 minutes will cycle through zero to sixty and back to zero. LED's 131 indicate am or pm.

After the clock 122, or any other function, is set, the device will automatically return to a normal display, or "default" mode. Default mode may also be entered by pressing a star key 125. In default mode, the clock display 122 shows the time, a zone display 132 shows the zone, a zone temperature display 134 shows the temperature in that zone, and a power display 136 shows power consumption as measured through the current probes and conditioning circuit 70. Display 132 cycles through installed zones, display 134 showing the temperature in the zone of display 132 and LED 135 showing whether or not the zone is using power. If zone one is hot water heater, temperature one is outside temperature.

During default mode, information may be entered by pressing a labelled, or mode, key, namely the clock set key 124, or a temperature zone key 138, a power set key 140, a night setback key 142, a timed zone key 144, an automatic lawn watering key 146, or a manual lawn watering key 148. Each key has an analogous LED indicator 150-160 arranged in a vertical column below the clock set indicator 126, and labelled on the display.

After the clock is set, the temperature controlled zones are set. This is done by pressing temperature zone key 138, illuminating LED 150. Following the row opposite LED 150, blocks 127 show that zones are set by key number three 162 and displayed in display 132, zone temperature is displayed in display 136, and the temperature setting (UTSP) is set by key number five 166. As in the case of clock setting, the displays will cycle through valid numbers only, as determined by the program and the installer. Holding key number three 162 cycles display 132 through numbers one to the highest temperature zone number, e.g. seven, then back to one. A selected zone is shown in display 132, and its temperature is shown in display 134. Holding key number five 166 cycles display 136 through valid temperature settings 40° to 90° F.

Figure 9:
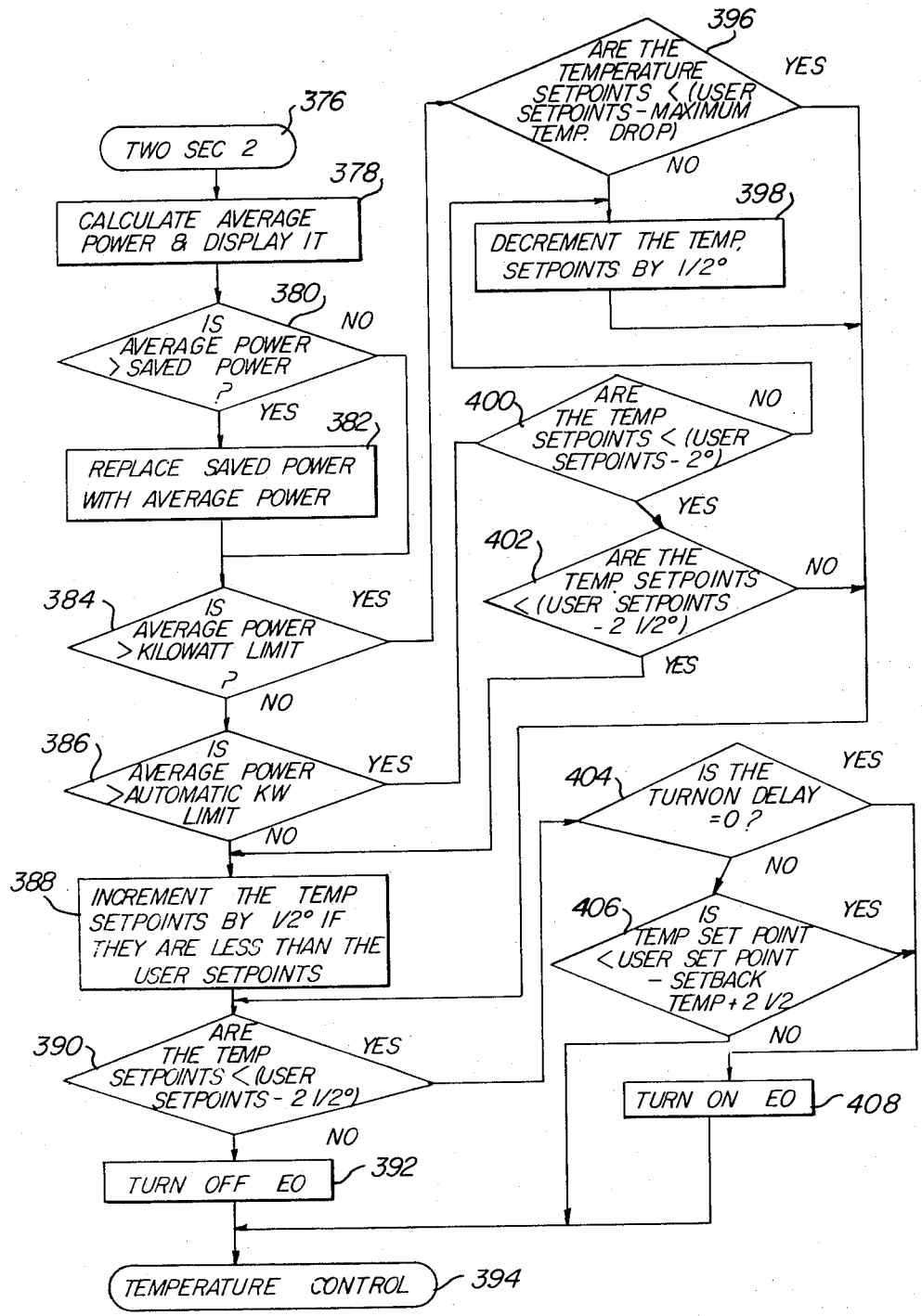

Next, the kw demand limit is set, USP, FIG. 9. The power set key 140 is pressed, illuminating the power set light 152. Reading across, it can be seen in blocks 127, 129 that key number four 164 sets the kilowatt limit, and this will appear in display 134. Holding key four cycles display 134 through valid kw limits 0 to 40, as determined by the software.

Night setback temperature may be set by pushing the night setback key 142, illuminating light 154. Reading across, it may be seen from blocks 127, 129 that key number one 128 and key number two 130 sets the night setback time as in clock setting am/pm indicators 161 being used. Key number three 162 sets the number of degrees are to be reduced at the night setback time, appearing in display 132, and cycling from 0 to 20 as determined by the software. Key number four 164 and key number five 166 set the time at which night setback expires, as in clock setting, the time appearing in displays 134, 136.

To set timed zones, time zone key 144 is pressed, illuminating time zone LED 156. Key three cycles through valid time zones, eg. 1-4, which are shown in display 132 until the zone to be set is selected. Reading across, turn on time is set as in clock set, and the turn off time is set as in setting RESTORE time.

To set automatic lawn sprinkling, lawn auto key 146 is pressed, illuminating light 158. Reading across, the start time is set as in clock set, the sprinkler zone to be watered (eg. zones 1-4) is set by key number three 162 and appears in display 132, cycling through preset sprinkler zones. The minutes of watering is set by key four 164, cycling through 0 to 95 minutes as determined by the software. The days between waterings is set by key number five 166 and appears in display 136, cycling from 0 to 7, 0 defeating automatic sprinkling.

For manual watering, the lawn man key 148 is pressed, illuminating light 160. The zone to be watered is set by key number three 162 and appears in display 132. The minutes of watering is set by key number four 164, cycling from 0 to 95 minutes, and appears in display 134.

The program which cuts off power to the hot water heater may be defeated by pressing hot water key 168 illuminating light 170. This operation is described in connection with block 434, FIG. 12.

As described in connection with block 354, FIG. 8, the alarm control may be silenced for 12 hours by the user by pressing an alarm off button 172 on the key pad. After the alarm silence key has been pressed, an LED 174 so indicates.

An LED 176 indicates an error condition and a code number will appear in display 136 to indicate one of the following error conditions: E0, temperature in a given zone has dropped more than 3° below a user set point because building demand has exceeded the user selected kw limit for a time sufficient to allow room cool down; E1, the clock must be reset after a power failure; E2, programming error; E3, memory loss, installation programming required; E4, zone temperature excessively high (per block 216, FIG. 4); E5, temperature sensor failure (block 412, FIG. 10); E7, internal component failure (block 266, FIG. 5).

As described in detail in connection with FIGS. 4–54, once installation and user set up is complete, the operation of the present device is essentially automatic. The device compares power consumption with a user-set power limit (UKL); if the preset power limit is exceeded, the device limits power to the hot water heater, zone 1, according to a preselected program that limits continuous off time to forty-five minutes, thereafter turning zone 1 on for one minute out of every four. If, after zone 1 is placed in a limiting condition, power must still be limited all temperature zones are cut $\frac{1}{2}°$ below the user set points. This should turn off power to all zones which are at their set point temperature. Power consumption is immediately checked again. If power still needs to be limited, the temperature set points are lowered another $\frac{1}{2}°$ to cut off power to zones warming up to within one half degree of their set point. Power consumption is immediately checked again. If power still needs to be limited, set points are lowered another $\frac{1}{2}°$, and so on, until a maximum lowering, e.g. 15°, is carried out. At this point, if power consumption still exceeds the UKL, the temperature will be maintained at this level but the power will exceed the set point.

Power consumption is also limited automatically according to an automatic kilowatt limit (AKL) initially set at 5 kw (block 216, FIG. 4) and calculated every noon according to the following formula:

New Auto Limit=Old Auto Limit$\times(1-1/15)+$today's peak$\div 15\times 0.8$.

This formula lowers or raises the automatic limit as actual peak demand decreases or increases.

If the AKL is exceeded, the device follows the same routine as for UKL, except that the temperature drop is limited to a maximum of 2.5°.

Description of the Software

The software, in general, includes an Initialization program, a Supervisor program, an Interrupt program, a Data Entry program, an Alarm Control program, a Two Sec 2 program, a Temperature Control program, a Time Zone Control program, a Hot Water Heater Control program, a Fan Control program, Nitedly 1 and Nitedly programs, a Sprinkler Control program, a Noon 1 program, and an A D Converter program, and a Data Entry Program.

Initialization

Referring now to FIG. 4, the initialization portion of the program, which sets up the present device on initial power up, is shown. This portion of the program is executed every time the processor is reset.

Initialization is entered at block 200, which leads to instruction block 202, which initializes the program fail detect 24. This is done so that the program fail detect 24 does not immediately determine that the program failed and cause another reset.

Next, decision block 204 checks the options and the external memory 56 in order to determine if external memory is intact. If external memory is intact, the program goes to block 214 which sets up interrupts and the power fail detect portions of the program; Initialization is left and the Supervisor is executed through block 218. If external memory is not intact, then block 206 is executed to initialize memory after a power failure. Block 206 restores options and any user entered information to normal memory and status from the internal battery 32 powered memory within the microprocessor 10.

Decision block 208 then checks to see if the options are correct. If not, there has been a loss of internal memory data and instruction block 216 will initialize any of the options and other information which has been lost. Block 216 clears internal memory; clears external memory; blanks all displays; sets arbitrary initial valves, namely: kw limit to 7 kw; sets automatic kw limit to 5 kw; sets alarm temperature to 98°; sets hot water heater installed; sets last temperature zone to #24; sets maximum temperature drop to 20°; limits to three heating zones on out of four, maximum; sets the power to single phase; sets voltage to 120 V; sets integration period to 15 minutes; sets options lost flag; creates and saves a checksum on the options; and sets all temperatures to 65°. This block proceeds to instruction block 212.

If block 208 determines that options are correct, Instruction block 210 clears all internal memory; clears non-initialized external memory; clears displays; restores the sprinkler data, the automatic kw limit, and the kw limit set point.

Block 212 performs initialization every time power comes on for any reason. This block initializes power measurement routines, sets the clock to 12 pm, sets the display to default mode, presets all measured temperatures to 45°, sets up the five memory check bytes used to determine external memory loss, sets the clock error alarm (E1), presets the second counter, restores the sprinkler data, and restores the continuous hot water indicator. The program then proceeds from block 212 to block 214, previously described.

Supervisor

Figure 5:
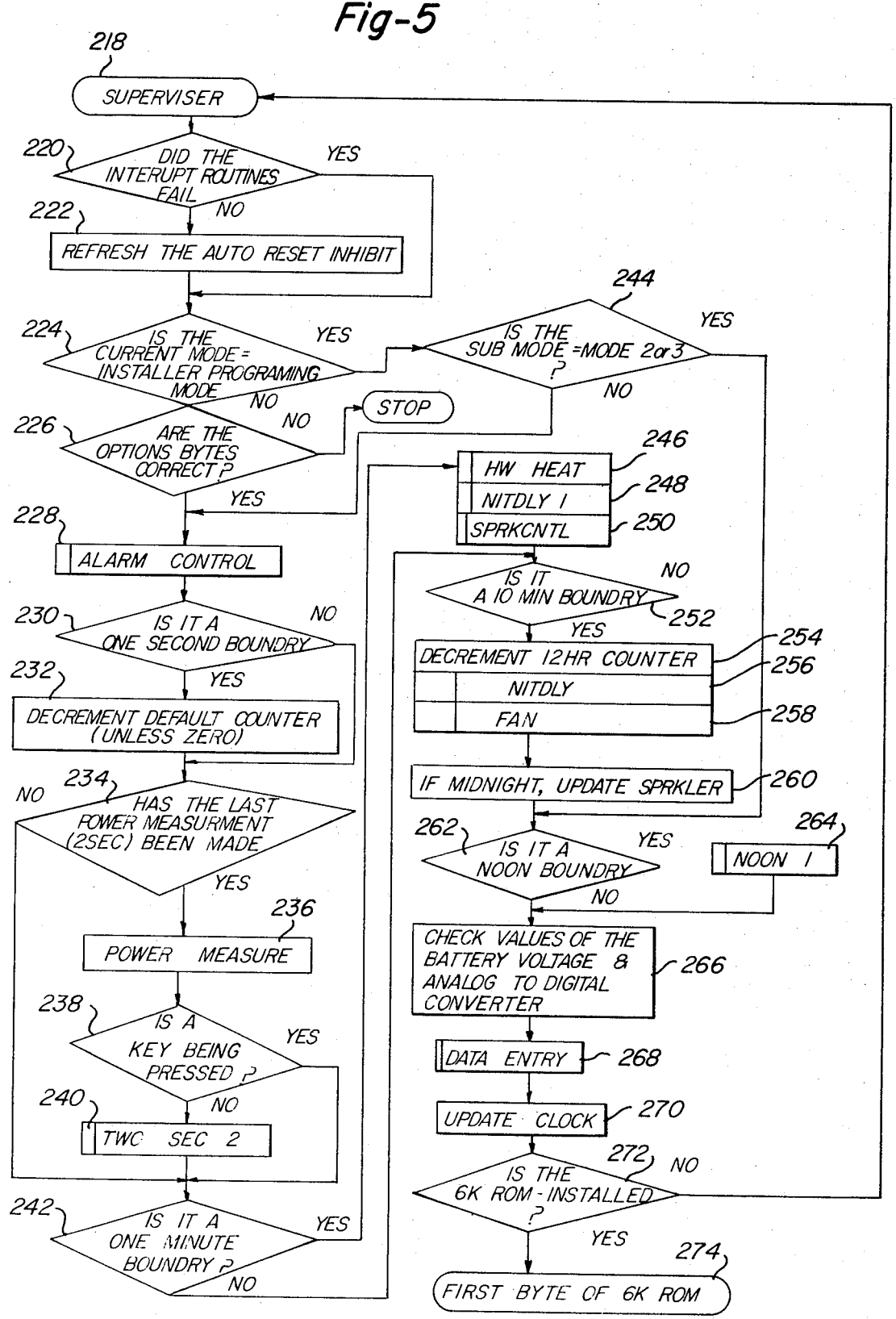

Referring now to FIG. 5, the Supervisor routine organizes and provides entry points for the other routines which are based upon time.

The Supervisor is entered at block 218 and proceeds to decision block 220, which checks the Interrupt routines (FIG. 6) to determine if they have failed. If they did not fail, block 222 refreshes the program fail detect circuit 24 so that it will not detect a program failure. If the Interrupt routines did fail, the program fail detect circuit 24 is not refreshed and, after about a one half second delay, the program fail detect circuit will cause the processor 10 to reset and start back with the Initialization program shown in FIG. 4.

Next, block 224 determines if the present mode is the installer programming or customer engineering (C.E.) mode. In the C.E. mode, initial data is entered as follows: the maximum temperature drop before UKL is exceeded; the number of sprinkler, temperature, and timed zones; whether the switch box is inside or outside (block 418, FIG. 10); the power input to the building; whether power is single or three phase; the integration period; the presence of a hotwater heater and attic fan; the high temperature alarm point.

If it is not in the C.E. mode, block 226 checks to see if the options bytes are correct. If they are not correct, memory has inadvertently been altered and the program will stop which will cause the program fail detect 24 to cause a reset. If the options bytes are correct, then the Supervisor calls the Alarm Control subroutine (FIG. 8) as shown in block 228.

Next, block 230 checks to see if the time is on a one second boundry. If it is, then block 232 decrements the default counter. The default counter is the counter that will cause the display 48, 50 to go to the default mode after one minute of no operator action on any of the keys. Block 234 then checks to see if the A D converter routines have measured all three of the current probes from block 70. If they have, then block 236 determines if there is a one or three phase installation and calculates instantaneous power, adding this power to a moving average scaled for a 15, 30 or 60 minute integration period, depending upon the installation code. Block 238 then checks to see if a key is currently being pressed. If it is, then block 240, subroutine Two Sec 2 (FIG. 9), is called, otherwise it is skipped.

Block 242 then determines if the time is on a one minute boundary. If it is on a one minute boundary, then block 246, H W HEAT (FIG. 12), block 248 NITEDLY 1 (FIG. 14), and block 250 SPRINKLER CONTROL (FIG. 16) subroutines are called.

The next check, block 252, determines if the time is currently on a ten minute boundary. If it is, then the twelve hour counter, block 254, is decremented. This counter turns off the alarm inhibit after twelve hours. The program next proceeds to block 256 NITEDLY (FIG. 15) and FAN CONTROL (FIG. 13) subroutines.

Block 260 updates the sprinkler data at midnight to count the days between waterings. Block 262 then determines if it is noon; if it is, block 264, the NOON 1 (FIG. 17) subroutine, is called. Block 260 then checks voltage in battery 32 and the analog to digital converter check values. If these values are not within preset limits, an E7 is displayed. Block 268, the DATA ENTRY subroutine (FIGS. 24–54) is next called, and block 270 updates the clock.

Decision block 272 determines if there is a 4 K or 6 K program in ROM 58. If there is a 6 K program, the program jumps to the first location at 4096, block 274. If a 4 K ROM is installed, the routine returns to the entry point of the supervisor at block 218 and the Supervisor is executed again. The additional 2 K ROM is reserved for future expansion.

If block 224 determines that the present mode is the installer programming mode, the program then checks at block 244 to determine if the sub mode of the installer programming mode is in a testing mode. If it is not, then no check is made of option bytes, since these will not necessarily be correct, and the program proceeds to block 228. If the mode is 2 or 3, the program skips most of the updating functions of the supervisor in order that the updating will not interfere with testing which the installer performs.

Interrupt Routines

Figure 6:
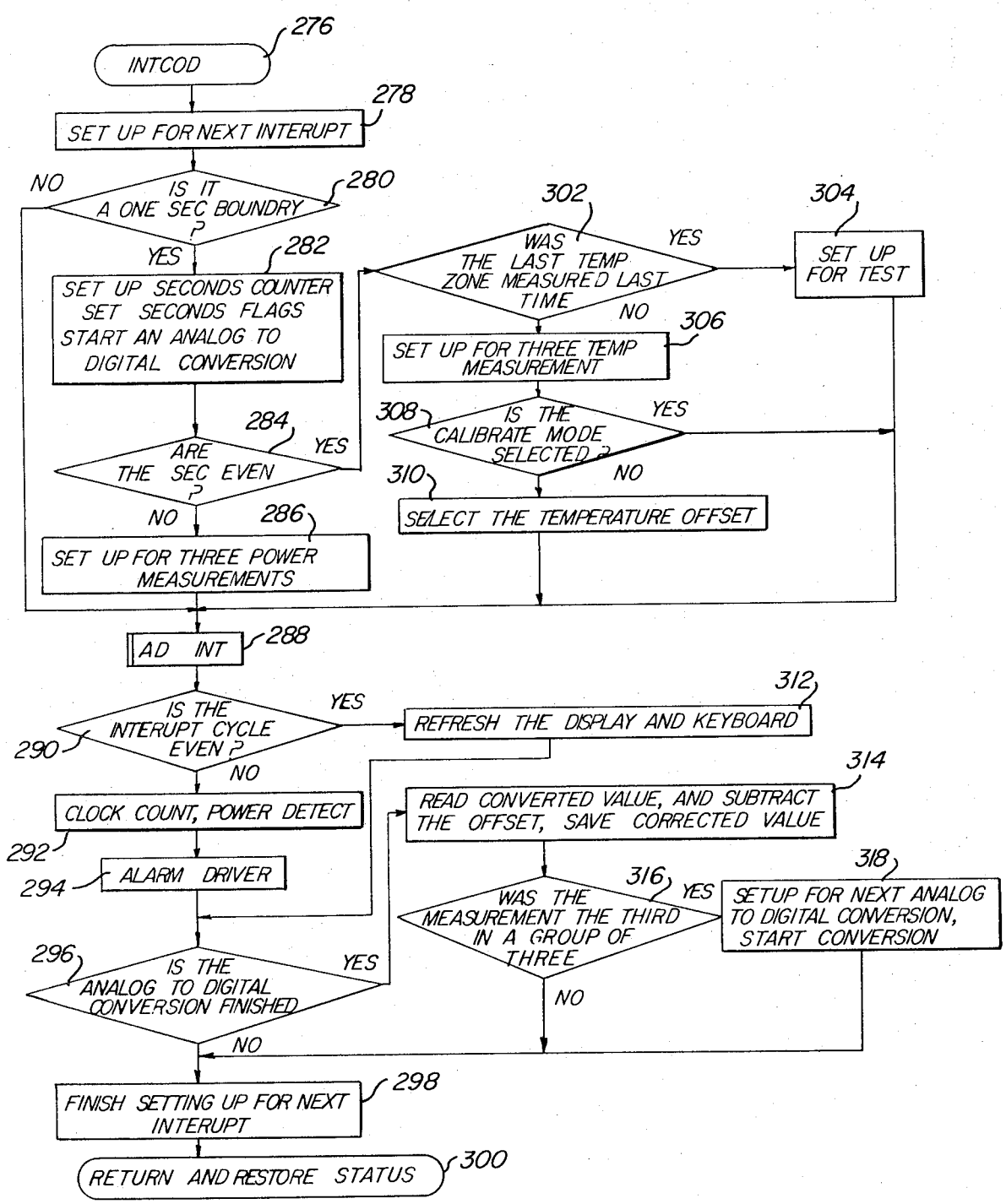

Referring now to FIG. 6, the interrupt routines are entered at block 276 every time there is an interrupt from the interval timer. This interval occurs every 520.8333 microseconds, as initialized in block 214, FIG. 4. Block 278 sets up the interval timer for the next interrupt.

Decision block 280 determines if the timer is currently on a one second boundary. If it is, block 282 sets up the seconds counter, sets the seconds flag, and starts the AD conversion. Block 284 then determines if the second is even or odd. During even seconds, temperature measurements are made, and during odd seconds power measurements. If it is an odd second, block 286 is executed, which initializes the AD converter for three power measurements, since the AD converter makes three power measurements per second. If the second was even, block 302 checks to see if the last temperature zone measured was the last temperature zone. If it was, then block 304 sets up the AD converter to measure the offset, the battery voltage, and the AD converter test. The program proceeds from block 304 to block 288. If the decision of block 302 was no, then block 306 sets up for three temperature measurements during this second. Block 308 then checks to see if the calibrate mode has been selected. If it has not, block 310 enables the temperature offset. The temperature offset is a value which is subtracted from the temperature probes by hardware shown at 69, FIG. 1, through a channel on multiplexer 66. If the calibrate mode has been selected, the program proceeds to block 288.

Block 288 performs the AD conversion. This software controls the multiplexer 66 and the integrator 68. This provides a dual slope conversion according to known techniques. The AD conversion is carried out beginning with every interrupt. If it is a temperature measurement, the multiplexer selects a temperature sensor and self check channels. The integrator integrates these until the integrated valve reaches zero. A comparator within the integrator then signals the processor through a threshold signal. The AD converter subroutine then turns off the self check input and turns on the offset current input and allows the integrator to integrate the offset and the unknown temperature. The AD converter allows this to occur for 256 interrupts, at which time it turns off the temperature and offset and turns on the reference channel. The reference is of opposite polarity from the temperature and offset inputs, so the integrator then slopes back down towards zero and the AD converter routine measures, in terms of interrupts, the time which it takes for the integrated value to reach zero. The value of this time is directly proportional to the temperature. In the case of current measurements, the multiplexer selects one of the conditioning circuits 70 from either current transformer a, b, or c, as the unknown and use that value plus the self check value until the integrator reaches zero, then it turns off the self check value, integrates up to 256 counts, then turns off the current transformer, turns on the reference and measure the time to integrate back down to zero. In the case of a battery check, or an auto zero, or a self check measurement, the multiplexer turns on one of those three, the integrator integrates up to 256 counts, the unkown is turned off by the program, the reference is turned on, and measures the time which it takes to integrate back down to zero. The AD conversion routine is described in detail in connection with FIGS. 18-23.

From AD conversion block 288, the program proceeds to decision block 290, which determines if the interrupt is odd or even. This is done to shorten the time spent in the interrupt routine into two portions, one executed only on even interrupts, one executed only on odd interrupts. During an even interrupt, block 312 is executed to refresh the display 48, 50 and checks the keyboard 44 for key closures. During an odd interrupt block 292 checks the 60 Hz zero crossing signal and generates one sixtieth second counts for clock, timing signals, and looks for power failures. If a power failure has been detected (no zero crossings for about one fourth second), the program will destroy the five memory check bytes, move all critical parameters and user entered data to the internal battery powered RAM, generate a checksum for the internal RAM, arm the Power Fail One Shot, and wait for the Program Fail Detect to generate a reset pulse. Block 294 then determines whether the loud or soft alarm should be on and then drives the alarm driver appropriately.

From block 312 and 294, the program proceeds to decision block 296, which checks to see if an AD conversion has been completed. If it has, block 312 subtracts the offset from the converted valve. This is the auto zero function of the AD converter. The corrected valve is saved in memory for use in the Temperature Control program, FIG. 10. From block 314, the program proceeds to decision block 316 which determines if the conversion is the third in a group of three. If it is not, block 318 sets the AD converter up for immediately starting the next conversion. If it is the third in a group of three, then all three AD conversions which were to be done during the second have been completed. There is no conversion until the next second determination by block 280.

The program proceeds from blocks 296, 316 or 318 to block 298, which initializes the interrupts, and thence to block 300 which returns the program to the interrupted location. Block 220 of the Supervisor determines interrupt failure by monitoring the block count maintained in Block 292.

Alarm Control

Figure 8:
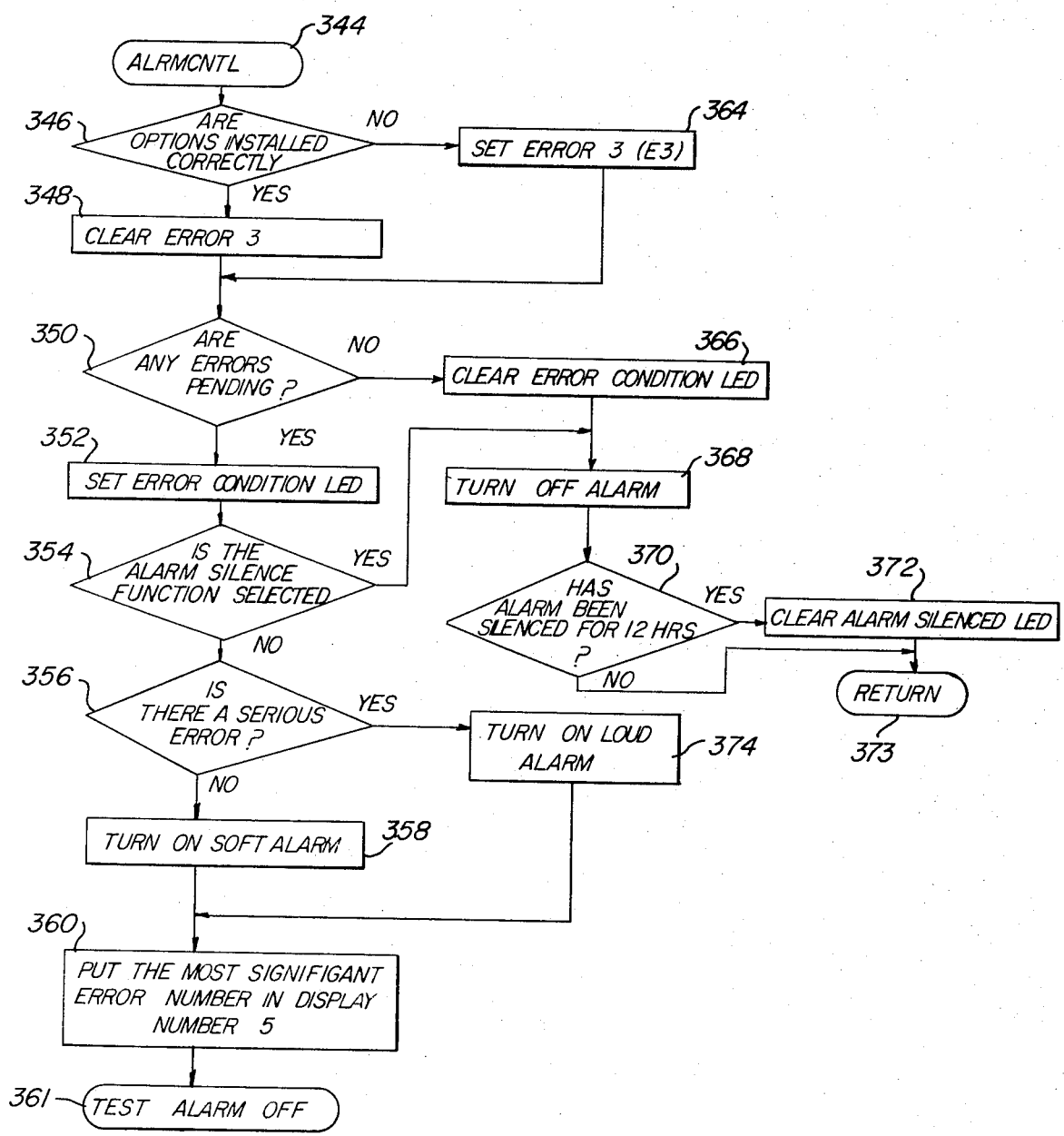

Referring now to FIG. 8, the alarm control subroutine is entered at block 344 and proceeds to block 346 which checks to see if the options are installed correctly by a cursory check of the installer entered data. This check also determines if options were lost due to a memory failure that would have been determined during Initialization in block 208 via the options lost flag.

If the options are correct, E3 is cleared in block 348, if they are not correct, E3 is set in block 364.

Block 350 then checks to see if there are any error codes pending. If there are not, the error condition LED is reset in block 366 and the program proceeds to block 368.

If there are errors pending, the error condition LED is turned on in block 352. Then, block 354 checks to see if the alarm silence indicator is on. If it is, block 368 turns off the alarm. Block 370 checks to see if the alarm silence indicator has been off for twelve hours. If it has, then the alarm silence indicator LED is cleared in block 372 which will allow the alarm to be turned on through block 354. The program returns to the Supervisor through block 373 from blocks 370 and 372.

If block 354 is no, block 356 determines if the errors pending from block 350 include a serious error (E5, E7). If there is a serious error, block 374 turns on the loud alarm through the alarm driver 38. If not, block 358 turns on the soft alarm. Blocks 374 and 358 proceed to block 360, which places the highest error number into the display 136. From block 360, connecting block 361 leads to block 370.

TWOSEC2

Referring now to FIG. 9, TWOSEC2 calculates and lowers temperature set points by ½° every two seconds while power is being limited according to the Temperature Control program, FIG. 10.

This routine is entered at block 376 from block 240 of the Supervisor and proceeds to block 378, which calculates the average power consumption and places it in the power display 136. Average power is determined by sampling power every two seconds, averaging this over thirty seconds, and placing this in a FIFO queue 30 bytes long, the oldest sample being discarded. The sum in the queue represents average power.

Decision block 380 then determines if the average power from block 378 is greater than the saved power (today's peak). If so, block 382 replaces the saved power with the averaged power. Blocks 380 and 382 save the highest average power used in a twenty four hour period. This value is used to calculate the automatic set points (ASP), discussed above.

Decision block 384 determines if the saved or average power is greater than the user kw limit (UKL). If this power is greater than the UKL, then block 396 checks to see if the actual temperature set points (ATSP) are less than the user set points (USP) minus a preset maximum temperature drop, preferably 20°, per block 216. This block implements the maximum temperature drop function, which prevents the temperatures from dropping below a predetermined level, regardless of the power setting. If the ATSP are below their maximum setting, the temperature decrementing is bypassed and the program proceeds to block 390. If the ATSP are not below their maximum setting, block 398 decrements the ATSP by one half of a degree, and the program proceeds to block 390.

If the saved average power is less than the kw limit, block 384, block 386 compares saved or average power with an automatic kilowatt limit (AKL) calculated from NOON 1. If AKL is less, block 400 determines if the ATSP are less than USP−2°. If the ATSP have not been dropped to this extent, block 398 is executed. If they have, block 402 determines if the ATSP are less than 2.5° below the USP. If so, the program goes to block 390. If not, the program goes to block 388, which increments the ATSP by one half of a degree if they are less than the USP. This function prevents the AKL from forcing the ATSP from being dropped more than 2.5° below USP.

Block 390, from blocks 388, 402, or 398, determines if the ATSP are 2.5° less than USP. If they are, block 404 determines if the E0 turn on delay is equal to 0. This delay inhibits the E0 alarm if the system is recovering from night setback. This resolves the conflict inherent in attempting to reheat a building which has been permitted to cool during night setback while limiting power. A preset time delay prevents the E0 alarm from coming on. If the delay is not zero, meaning the delay time has not elapsed, block 406 determines if the ATSP is less than USP minus a user selected setback temperature plus 2.5°. If it is, there has been excessive cooling and E0 is turned on through block 408. If it has not, the program proceeds to block 394 of the Temperature Control program, FIG. 10. If no error condition should be on, as determined by block 390, block 392 turns off the E0. Blocks 392 and 408 also proceed to block 394.

To reiterate, TWOSEC2 first checks to see if power consumption is exceeding the user's preset power limit, if it is, the temperatures in the rooms are dropped to a maximum temperature drop which may be 5°, 10°, 15° or 20° as determined during installation. The temperatures in the rooms may also be lowered to a maximum of 2.5° below user set points by an automatic kw limit calculated in NOON 1, FIG. 17. This provides an extra saving of power without compromising user comfort.

Temperature Control

Referring now to FIG. 10, the Temperature Control routine basically looks for open or shorted sensors, looks for the over temperature condition, and regulates room temperatures based on the set points. It also limits the number of heater controlling relays which are on, in order to reduce power dissipation in the relays.

Block 394 proceeds to block 410, which turns off the sensor (E5) and over temperature (E4) alarms. Block 412 then examines all temperature sensors. If any are bad, it turns on Error E5 and turns off the heater for that zone. Block 414 then checks the temperature in all zones, and if any zone temperature is greater than the alarm temperature, the over temperature alarm E4 is turned on. Block 416 then looks at all zones except those with bad sensors. It will turn on any zone heater where the zone temperature is less than that zone's ATSP, minus the night setback temperature if the time is during night setback. If the time is not during night setback, the zone temperature is only compared to the ATSP. All other heaters are turned off. Block 418 then limits the number of heaters on in a group of four to three out of the four, depending on the outside temperature. When apparatus is installed, limiting to three out of four heaters, to restrict the number of relays in a group of four to limit the power dissipation in the heat sink on the solid state relay, depending on the outside temperature, e.g. only limit to three if the outside temperature is above 35° F. Block 420 returns the program to the Time Zone Control.

Time Zone Control

Referring now to FIG. 11, the time zone control controls selected outputs from buffer 62, which are not used for zone temperature control, on the basis of time, to provide timed outlets, etc. It utilizes the software clock of the Supervisor.

The program is entered at block 422 from block 420 and proceeds to block 424, which turns on any timed zone if the clock time is between the start time and the end time for that zone, as entered through keyboard 44, or if the start time for that zone is equal to zero and the end time for that zone is not zero. Block 426 turns off all timed zones that were not turned on by block 424 and also turns off any zone having an end time equal to 0. Block 428 returns to the Supervisor at block 240, TWO-SEC2.

Hot Water Heater Control

Figure 12:
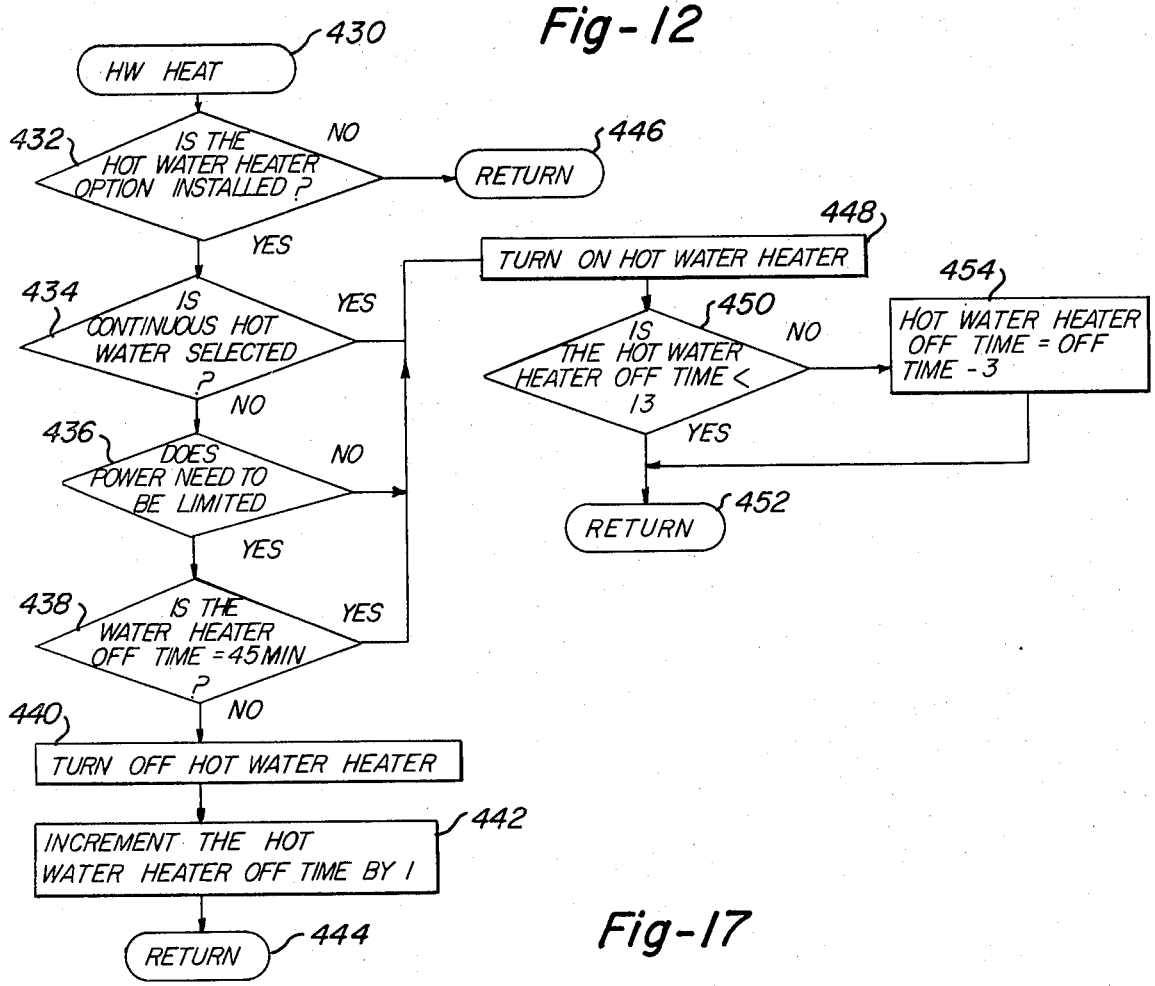

Referring now to FIG. 12, the hot water heater control program turns off the hot water heater as soon as power needs to be limited.

This routine is entered at block 430 from block 246 of the Supervisor and proceeds to decision block 432, which determines if a hot water heater is installed. If not, the program returns to the Supervisor through block 446. If so, the program proceeds to decision block 434, which determines if continuous hot water is selected.

If it is, block 448 turns on the hot water heater, and block 450 determines if the hot water heater off time is less than 1. This is done through a software counter from one minute block 242. If off time is not less then block 454 subtracts three from the hot water heater off time count. From blocks 450 and 454, the hot water heater returns to the Supervisor through block 452.

If block 434 is no, block 436 determines if power needs to be limited by checking to see if the ATSP's are less than the USP's. If it does not, the program goes to block 448. If it does, the program goes to block 438, which determines if the hot water heater off time counter is equal to 45. If it is, the program goes to block 448. If it is not, the hot water heater is turned off at block 440 and block 442 increments the hot water heater off time counter by 1. The program then returns to the supervisor through block 444.

The hot water off time counter is a software counter which counts up 3 at a time and down 1 at a time at one count per minute. It is in fact, a negative type of counter. It, therefore, counts down through block 442 as the hot water heater is off then up as the hot water heater is on. If the hot water has been on an power needs to be limited, the hot water heater will be turned off and the counter will count from zero in 45 minutes through block 442. After 45 minutes of power limiting off time, the hot water heater is controlled through blocks 438, 448. As block 450 is initially entered, the hot water heater off time counter will be 45, not less than 1, so block 454 will count down three. From block 454, the program returns. The next time through the program, block 438 will be "no", causing block 442 to increment off time by 1. This will happen three times, until off time again equals 45 minutes in block 438, at which time block 448 turns on the hot water heater.

The foregoing ensures that, after a 45 minute off time, the hot water heater will be on for 1 minute and off for three minutes, thereby being at 25% power.

Fan Control

Referring now to FIG. 13, this routine is entered once every ten minutes from block 258 of the Supervisor and turns an attic fan off and on according to a temperature set point.

The routine is entered at block 456 and proceeds to decision block 458 which determines if an attic fan is installed. If so, decision block 460 determine if the attic temperature is greater than the temperature set point for the attic fan. If it is, the attic fan is turned on at block 466. If it is not, the attic fan is turned off at block 462. From blocks 462, 466 or 458, the routine returns to the Supervisor through block 464.

Nitedly 1

Referring now to FIG. 14, the Nitedly 1 routine decrements the E0 turn on delay each minute until it reaches zero. It is used in conjunction with Nitedly, FIG. 15.

This routine is entered at block 468 once per minute from Supervisor block 248 and proceeds to block 470, which determines if the E0 turn on delay is equal to zero. If it is, the routine returns to the Supervisor through block 474. If not, block 472 decrements the E0 turn on delay by 1. The E0 turn on delay is read at block 404, FIG. 9.

The software counter counts a preselected time, such as 15 minutes.

Nitedly

Referring now to FIG. 15, the Nitedly routine delays E0 turn on. It is entered every ten minutes from Supervisor block 256 at block 476 and proceeds to block 478, which determines if the clock is equal to the night setback restore time, i.e. the time when the heating system is beginning to recover from night setback. If so, block 480 sets the E0 turn on delay counter to the night setback temperature in degrees times 16 minutes. The program then proceeds to block 482.

The E0 turn on delay counter is decremented by block 472 every minute when it reaches 0, after this time, block 408 (FIG. 9) may turn on the E0 alarm it required.

Sprinkler Control

Referring now to FIG. 16, the Sprinkler Control routine turns on a number of sprinkler zones sequentially for set periods of time on preselected days.

This routine is entered at block 484 from block 250 of the Supervisor and proceeds to block 486, which determines if any sprinkler zones are installed. If not, the program returns to the Supervisor through block 514. If so, block 488 determines if the last manual zone which was on is equal to the current zone number. A manual zone is one set in the manual sprinkler mode. If the last manual zone on is not equal to the current manual zone number, block 490 turns off the last manual zone.

Decision block 492 then determines if manual water minutes have counted down to zero. This happens when watering time for that zone has expired. If it has, the manual zone is turned off in block 516. If it has not, block 494 decrements the manual water minutes, and block 496 turns on the manual zone.

Block 498 then determines if automatic watering has started. If it has not, block 500 determines if it is time to start the automatic watering. Block 500 is controlled by a seven day clock updated by block 260 (FIG. 5). If it is not time to begin automatic watering, block 502 returns the program to the Supervisor. If it is time to start automatic watering, block 504 sets appropriate flags to start the automatic watering sequence as entered by the user. An automatic watering sequence, for instance, would be: one day, every three days; auto sequence, 9:00 am, zone 1 five minutes, zone 2 ten minutes.

Block 506, then sets remaining time to water equal to water minutes for the first zone selected. Block 508 then determines if the time left to water is equal to zero. If not, time left to water is decremented by 1 at block 518 and block 520 turns on the zone, and the program returns to the Supervisor through block 522. If so, block 510 turns off that zone and advances to the next zone.

Block 512 then determines if all sprinkler zones have been watered. If so, the routine returns to the Supervisor through block 522. If not, the program returns to block 506.

NOON 1

Figure 17:
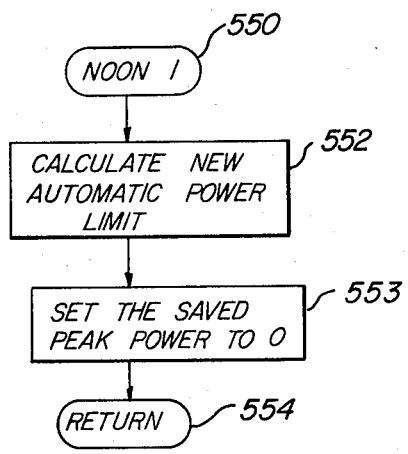

Referring to FIG. 17, Noon 1 (block 264, FIG. 5) is entered at block 550. At block 552 the New AutoLimit (AKL) is calcuated. The formula for New Autolimit is New Autolimit=Old Autolimit$\times(1-1/15)+$(Saved Peak Power$\div 15\times 0.8$). Block 553 then sets the Saved Peak Power to 0. This is done so that a new Peak Power can be determined for the next 24 hours. Block 554 returns to the Supervisor.

ADINT

Figure 18:
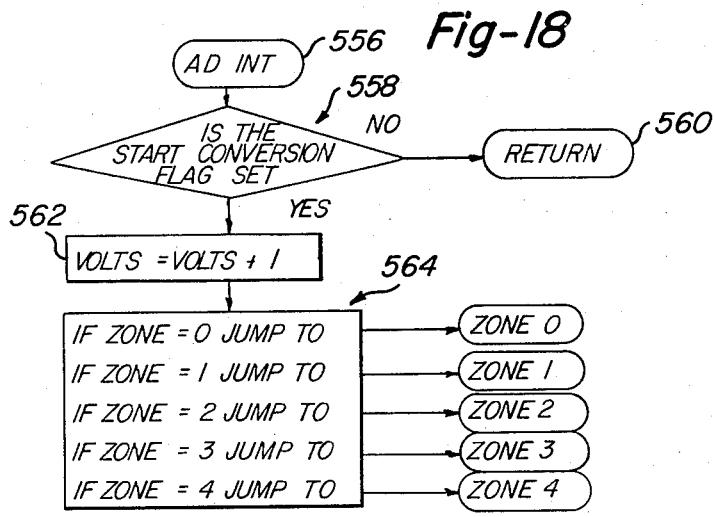

Referring to FIG. 18, ADINT is entered at block 556. The ADINT is the AD converter routine which converts a variety of different senses or analog signals into a digital form which can be read by the microprocessor. This is referenced at block 288, FIG. 6, and uses a dual slope technique. At block 558, the conversion flag is looked at. If the conversion flag is not set, the program proceeds to block 560 which returns to FIG. 6, block 290. If the conversion flag is set, then a combination internal counter and output counter is incremented by one. This counter is called volts, block 562. At block 564 the value of the variable zone (one through four) is checked. Depending upon the number which that zone equals, between 0 and 4, the program then will go to various places, either through FIGS. 19, 20, 21, 22 or 23.

Zone 0

Figure 19:
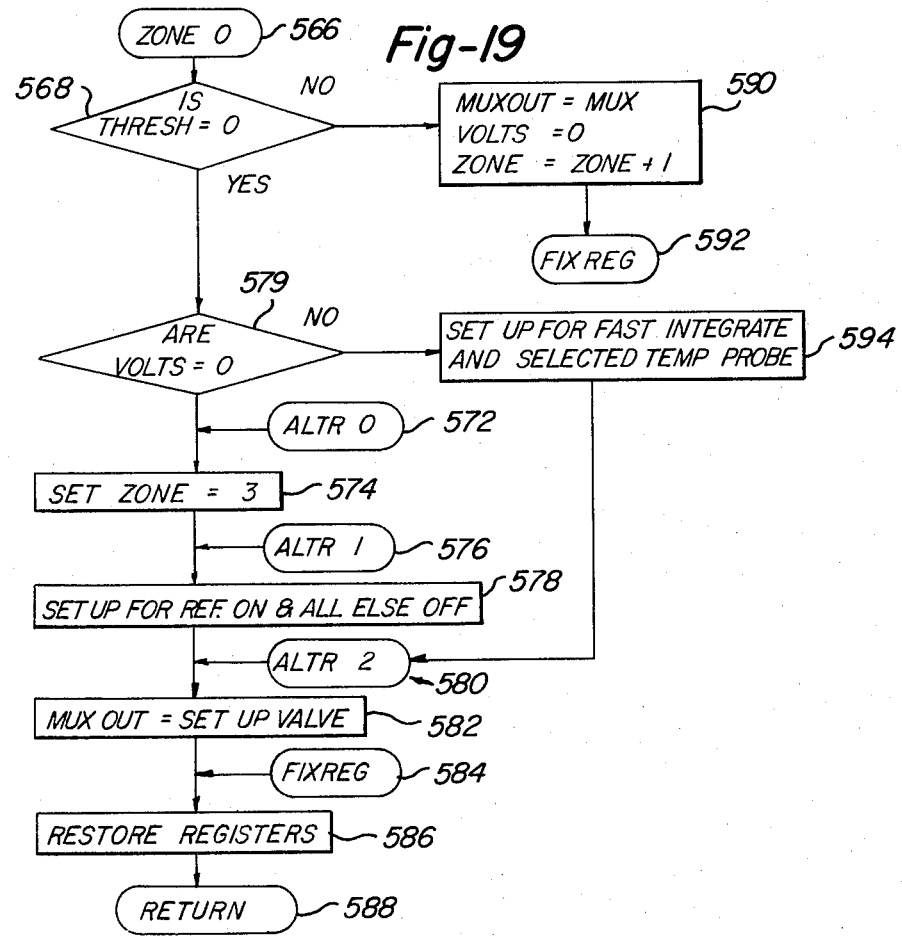

Referring to FIG. 19, Zone 0 is entered at block 566. At block 568, threshold is looked at. If threshold is 0, then the program proceeds to block 570, where volts are looked at. If volts are equal to 0, the zone is set to 3 at block 574. By doing this, the AD conversion will be stopped and everything restored during the next pass through the AD converter. The program then goes beyond block 576 to block 578 where a variable is set up to turn on the reference signal so that the AD converter will be set up in advance for the next conversion. This in turn sets up this variable for all else off. The program then proceeds beyond block 580 to block 582 where the variable in block 578 is output. The program then proceeds beyond block 584 to block 586, where the registers and storage locations are set to their proper values. The program then proceeds to block 588 which returns to the Interrupt Routines at block 290.

Referring back to block 568, if the threshold was not equal to 0, block 590 outputs the value determining what sensor is to be looked at. Volts are set equal to 0 preparatory to using volts as a counter for the next zone. The zone is then incremented by 1 and in this case zone now equals 1. The program then proceeds to block 592 which leads to block 584, already discussed.

Referring to block 570, if the volts are not equal to 0, the program then proceeds to block 594 where there is set up a variable to turn on the fast integrate and also a temperature probe is selected, which will cause the first part of the upward slope of the AD converter to rise up to threshold. Selecting the temperature probe also overcomes any turn on delays within the temperature probe itself. The program then proceeds to block 580, previously discussed.

ZONE 1

Referring to FIG. 20, Zone 1 is entered at block 596. At block 598, threshold is looked at. If threshold is equal to 0, block 608 sets volts equal to 0. From block 608, the program proceeds to block 609, which leads to block 572, FIG. 19. If, at block 598, threshold is not equal to 0, block 600 looks at volts. If volts are not equal to 0, the program then goes to block 610, which leads to block 584, FIG. 19. If volts are indeed equal to 0, the program proceeds from block 600, past block 602, to block 604 which sets the zone equal to zone +1 which in this case would make the zone equal to Zone 2. Block 606 then leads to block 576, FIG. 19.

Zone 1 is used to count upwards for a fixed length of time for the first half of the dual slope conversion.

ZONE 2

Zone 2 is used to count down on the second half of the dual slope conversion. It counts down from whatever voltage Zone 1 left it at. It counts down until it crosses threshold. The value in volts at that time is the actual digital conversion value.

Referring to FIG. 21, Zone 2 is entered at block 611. At block 612, threshold is looked at. If threshold equals 0, the program proceeds to block 622, which leads to block 602, FIG. 20. If, at block 612, threshold is not equal to 0, the program proceeds to block 614, where volts are looked at. If volts are not equal to 0, block 623 goes to block 584, FIG. 19. If volts are indeed equal to 0, the program proceeds to block 616, which sets the zone equal to the next zone, which, in this case, would be Zone 3. The program then proceeds past block 618 to block 620, where volts are set to volts minus 1. In this case volts would be set to decimal 255 or hexadecimal FF, that being the value for an overflow condition. The program then proceeds from block 620 to block 621 which leads to block 584, FIG. 19.

Zone 3

Referring to FIG. 22, Zone 3 is used to allow the value of the slope to be below threshold and maintain it there for the next conversion. Zone 3 is entered at block 624, which proceeds to block 625, where volts are set to volts minus 1. This is to offset the automatic incrementation of volts on the entrance to this routine. This maintains the correct value in volts. Block 625 proceeds to block 626 where threshold is looked at. If threshold is 0, the program proceeds to block 627, which leads to block 602, FIG. 20. If threshold is not equal to 0, the program proceeds to block 628, which leads to block 576, FIG. 19.

Zone 4

Referring to FIG. 23, Zone 4 is used to completely set up for the next AD conversion. Zone 4 is entered at block 629. At block 630, the zone is set to 0, the conversion flag is also cleared, signifying end of conversion and allowing new conversion to start. Block 630 proceeds to block 631 which leads to block 618, FIG. 21. This completes the AD interrupt program.

DATA ENTRY PROGRAM, FIGS. 24-55

All data entered into the processor and the mode of prompting allowable input/output from keyboard and its displays is handled through the Data Entry routines. The Data Entry Program described below represents the preferred manner of imparting the above-described data entry functions to the keyboard, display, and memory of the present apparatus.

Referring to FIG. 24, Data entry is entered at block 632 from the Supervisor. At block 634 the program checks to see if 60 seconds has elapsed since the last key press. If 60 seconds has elapsed, the program proceeds past block 636 to block 638, where all mode LED's are turned off and the default mode is selected.

All modes are set through the subroutine Mode Select which comes next at block 640.

Following block 640 is block 642, which corrects the value actually input from the keyboard to emulate a different keyboard layout, to allow the program to compensate for different keyboard layouts if so desired. Block 642 leads to block 644, which looks to see if a key is pressed and not yet acknowledged or seen by the program. If those set of conditions do not exist, and the key has either not been pressed or has been pressed and also acknowledged, the program goes to block 648 which looks to see if the key is held down. If the key is not being held down (to cycle valid numbers), the program proceeds to block 650, which simulates that key 3 was the last key pressed and it also simulates that the key is not being pressed or held down. Key 3 is chosen because the memory location for key 3 is also tied to display 4 (cf. block 650). The program proceeds on to block 654 which checks to see if the last key pressed was a numbered key. If the answer is no, the program proceeds to block 650, above.

If the last key pressed was indeed a numbered key, block 654 proceeds to block 656 which, depending upon the mode number (cf. block 676), leads to various subroutines.

Block 656 is wherein the particular valid numbers for a particular mode are set up.

A table of five pointers is used for each mode, there being five displays. Each pointer in a table points to a data table. Each data table contains a set of valid numbers for that display. Some valid numbers are factory set; others are set in the C.E. mode. The tables of pointers are consecutive in the memory. If mode equals 0, 2 or 3, the program goes to Default. If mode equals 1, it goes to Hotwater. If mode equals 4, it goes to Setclock. If mode is 5, it goes to Set Temperature. If mode is 6, it goes to Set Power. If mode is 7, it goes to Set Night. If mode is 8, it goes to Set Timed. If mode is 9, it goes to Set Auto. If mode is 10, it goes to Set Manual. If mode is 11, it goes to Editor.

Referring back to block 634, which looks to see if 60 seconds has elapsed since a keypress, if 60 seconds has not elapsed since a key press, block 634 goes to block 642, already discussed.

At block 648, if a key was being held down, the program then proceeds around to block 654, already discussed.

At block 644 if a key has been pressed and not yet acknowledged or seen by the program, the block then proceeds to block 646 which goes to "pressed" which is block 667 in FIG. 26.

PRESSED

If a mode key is pressed, Pressed puts the program into the appropriate data entry functions for that mode.

Referring to FIG. 26, block 667 proceeds to block 668, which sets up or initializes the count for the 60 second timeout to default mode. Proceeding from block 668, block 670 sets the change flag and sets a skip counter to 3. Setting the change flag causes a digit to be altered immediately, depending upon the key which is pressed and in the display relating to that key. Setting the skip counter to 3 then causes a delay between the time that initial change of the character took place until the next change of character can possibly take place. Block 670 proceeds to block 672, which acknowledges the key press. We then proceed to block 674 which looks to see if the last key pressed was a numbered key. If the last key pressed was indeed a numbered key, the program goes to block 675, which leads to block 652, FIG. 24, and thence down to block 654, already discussed.

If, at block 674, the last key pressed was not a numbered key, then, depending upon the key which was pressed, which will be a mode key, block 676 goes to various places. As shown, if the key pressed was the Hot Water key, it jumps to mode 2. If the key pressed was Alarm Off, it jumps to mode 1. If the key pressed was the Default or star button, it jumps to mode 3. If the key was Clockset, it jumps to mode 4. If the key was Temperature Set, it jumps to mode 5. If the key was the Power Set, it jumps to mode 6. If the key was Niteset, it jumps to mode 7. If the key was Time Zone, it jumps to mode 8. If the key was Lawn Auto, it jumps to mode 9. If the key was Lawn Manual, it jumps to mode 10. If the key was blank key 149, it jumps to mode 11. If the key was none of the above, it jumps to mode 3.

MODE SELECT

Mode Select finds the memory location which contains the selected mode.

Referring to FIG. 25, Mode Select is entered at block 658. At block 659 the program looks to see if the last mode was equal to the C.E. or customer engineer mode. If it was, the program proceeds to block 660 where all errors are cleared. Block 662 then creates a checksum on the options Bytes. These are the Bytes entered in by the customer engineer or the installer and determine the control characteristics of the particular unit. Block 662 proceeds to block 664 where the current mode is set equal to the selected mode. Block 666 then returns to block 640.

If, at block 659, the last mode was not equal to the C.E. mode, the program proceeds to block 664.

MODE 1

The various modes provide servicing to each individual program function by carrying out the instructions entered by the user.

Figure 27:
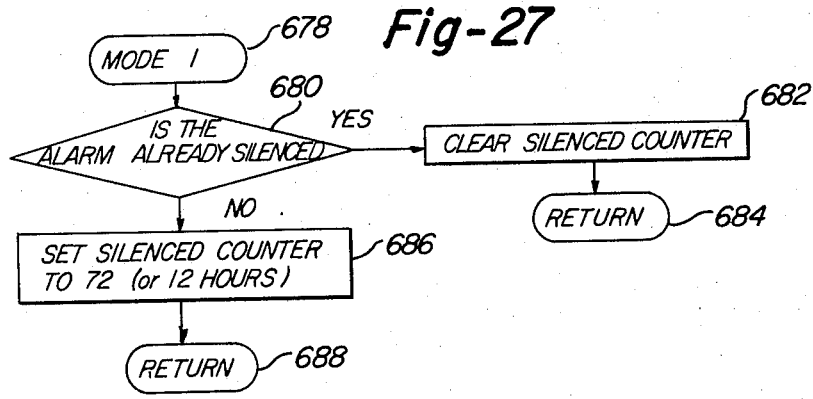

Referring to FIG. 27, Mode 1 is entered at block 678. Block 680 then looks to see if the alarm has already been silenced. If the alarm has already been silenced, the silenced counter is cleared and we proceed to block 684 which returns to block 270, FIG. 5.

If the alarm has not already been silenced, block 680 proceeds to block 686, where the silenced counter is set to 72, which, since it is updated every 10 minutes, equals 12 hours. Block 686 proceeds to block 688 which returns to block 270, FIG. 5.

MODE 2

Figure 28:
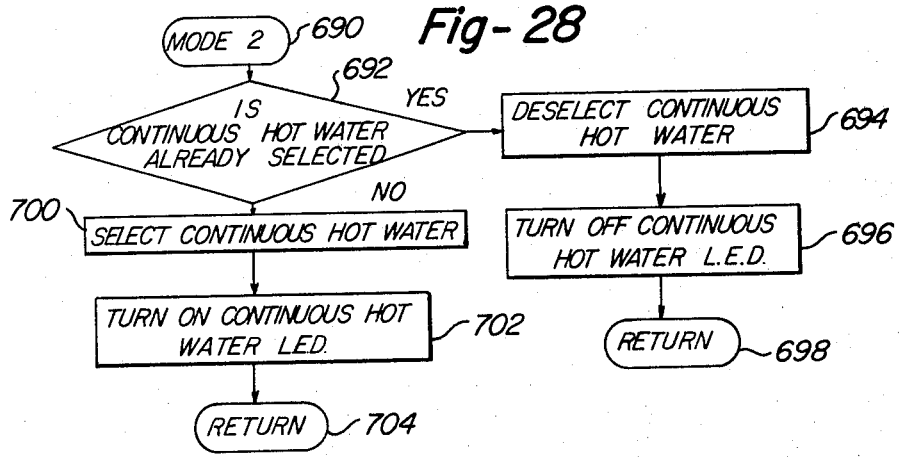

Referring to FIG. 28, Mode 2 is entered at block 690. Block 692 then checks to see if continuous Hotwater has already been selected. If it has already been selected, the program proceeds to block 694 which deselects the continuous Hotwater function and turns off the continuous Hotwater LED block 696, which proceeds to block 698, which returns to block 270, FIG. 5. If, at block 692, continuous Hotwater was not selected, the program proceeds to block 700, where the continuous Hotwater function is selected and proceeds to block 702 where the continuous Hotwater LED is turned on. Block 704 then returns to block 270, FIG. 5.

DEFAULT

Default cycles the display through the temperature zones and shows the zone temperature and set point in each zone.

Figure 30:
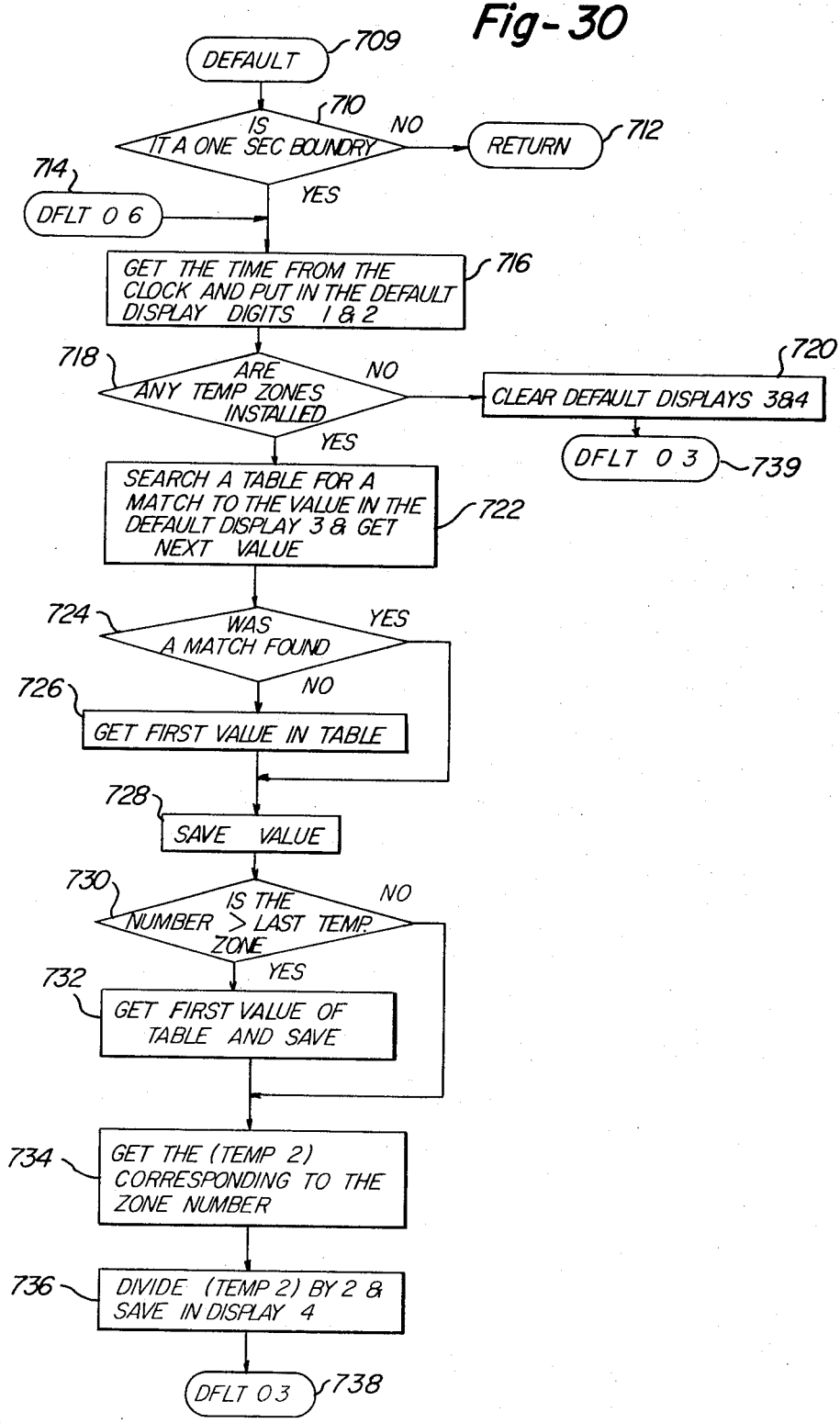

Referring to FIG. 30, the Default portion of the Data Entry Routines is entered at block 709. At block 710 whether or not it is a one second boundary is checked. If it is not a one second boundary, block 712 returns to block 270, FIG. 5. If indeed it was a one second boundary, the program goes from block 710 to block 716, which gets the time from the clock and puts it in the memory locations corresponding to the Display Digits one and two (122, FIG. 3), and proceeds to block 718, which checks to see if any temperature zones are installed. If the temperature zones are indeed installed, block 722 searches through a table of temperature zones (a table of numbers of 1 to 24) for a match to the value in a Default Display number three 132, which is the zone number, and gets the next value. Then block 724 checks to see if a match was found in that table. if a match was not found in that table of numbers, the program proceeds to block 726 which gets the first number in the table, which would be 1. Block 728 then saves that value in the memory location corresponding to Display three 132.

Referring back to block 724, if a match was indeed found, block 724 then proceeds down to block 728, discussed previously. Block 728 goes to block 730, which checks to see if the number in Display three memory is greater than the last temperature zone allowed by the options bytes entered either by the C.E. or the installer. If the number is greater than the last allowed temperature zone, block 730 goes to block 732 which gets the first value of the table, which would be 1, and saves it in the memory location corresponding to Display three. The program then proceeds to block 734, which gets the temperature times 2 corresponding to the zone number in Display 3 memory, then proceeds to block 736 where that quantity (temperature) time 2 is divided by 2. This is the true temperature and which is saved in the memory location corresponding to Display four 134. Block 736 proceeds to block 738 which leads to block 740, which is also called Default 03. At block 724, if a match was indeed found, the program proceeds around block 726 to block 728. At block 730, if the number represented in display three is not greater than the last allowed temperature zone, the program goes around block 732 to block 734.

DEFAULT 03

Referring to FIG. 31, Default 03 is entered at block 740. Block 741 checks to see if an error condition exists. If it does indeed exist, the program goes to block 742, which checks to see if the alarm is silenced. If the alarm is indeed silenced, the program proceeds to block 744, which gets the kilowatt usage and saves it in the memory location corresponding to digit five in the Default Display.

The program then proceeds to block 746 which checks to see if the zone number represented in Display three is turned on. If it is not turned on, block 746 proceeds to block 750, which turns off the zone power LED.

The program then proceeds to block 752, where the digits in the memory locations corresponding to the Default mode are placed in the memory locations where the Interrupt Routine will display them. Block 752 proceeds to block 754, where the AM/PM indicator 161 is cleared, and to block 756, which checks to see if an error condition exists. If an error condition does indeed exist, block 756 proceeds to block 758 to see if the alarm is silenced. If the alarm is not silenced, block 758 proceeds to block 760 which places a "E" in the actual memory location which is displayed by the interrupt routines as the first digit of display five 136. The program then proceeds to block 762 which returns to block 270 in the Supervisor Routine.

At block 741, if an error condition does not exist, the program goes around block 742 to block 744. At block 742, if the alarm is not silenced, the program goes around block 744 to block 746. At block 746, if the zone number represented by display three is indeed turned on, the program proceeds to block 748, where the zone power LED is turned on Block 748 proceeds to block 752, already discussed. At block 756, if an error condition does not exist, the program proceeds down to block 762, already discussed. At block 758 if the alarm is silenced the program proceeds to block 762.

MODE 3

Referring now to FIG. 29, Mode 3, which is entered at block 706, goes to block 707 which calls the subroutine Hotwater, which starts at block 636, already discussed. After the subroutine Hotwater, block 708 goes to block 714, FIG. 30, which leads to block 716.

MODE 4

Figure 32:
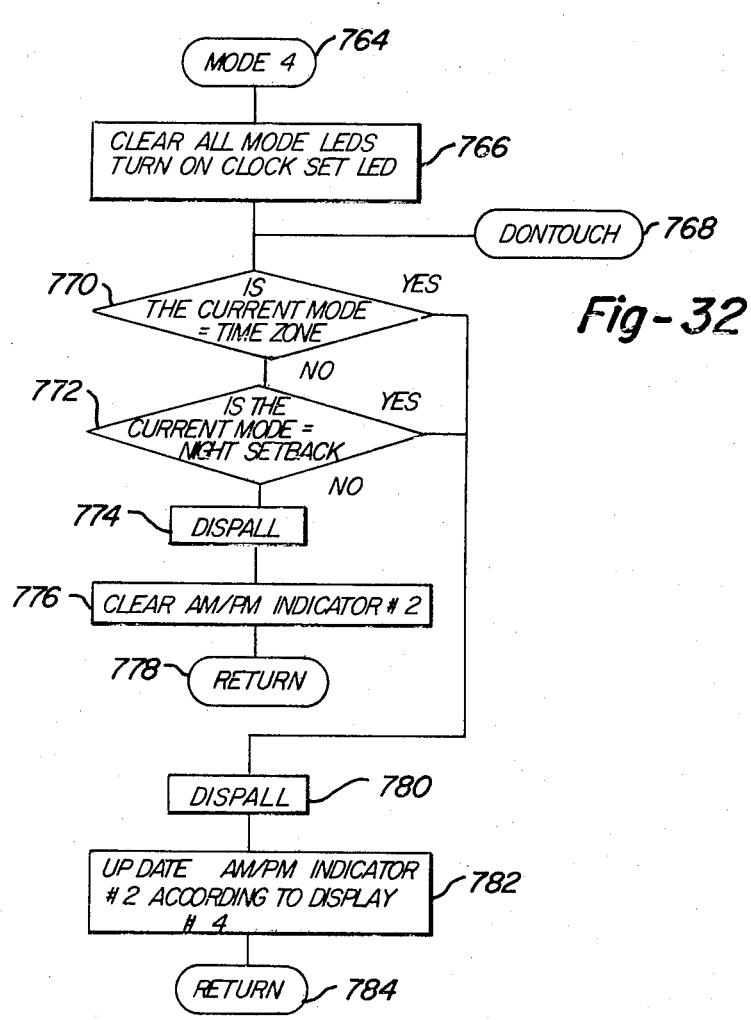

Referring to FIG. 32, Mode 4 is entered at block 764, which proceeds to block 766, which clears all the mode LED's and turns on the Clock Set LED 126. Block 766 proceeds past block 768, the entry for Dontouch, below, to block 770, which looks to see if the present mode is the Time Set mode. If it is not, the program proceeds to block 772, which looks to see if the present mode is equal to the Night Setback mode. If it is not, the program proceeds to block 774, which calls the subroutine Dispall. The program then proceeds to block 776, which clears the AM/PM indicator 161. Block 776 proceeds to block 778 which returns to block 270.

Referring back now to block 770, if the present mode is indeed equal to the time mode, then the program goes to block 780, which calls the subroutine Dispall and then to block 782, which updates the AM/PM indicator 161 according to the number displayed in display four. Block 782 proceeds to block 784, which returns.

Referring now to block 772, if the present mode is indeed equal to the Night Setback mode, the program goes to block 780, already discussed.

SETMODE

Setmode clears LED's and lights the appropriate LED 126, 150–160 for the mode selected.

Figure 36:
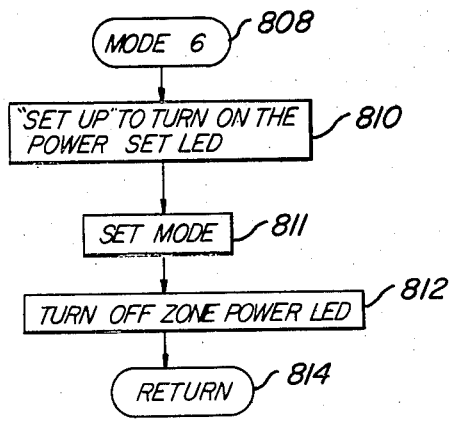

Referring now to FIG. 33, Setmode is entered at block 786 from block 811, FIG. 36. At block 788, all the mode LED's are cleared followed by the previously "set up" mode LED being turned on. The program then proceeds to block 789, which leads to block 768, FIG. 32, which leads to block 770, already discussed.

MODE 5

Figure 34:
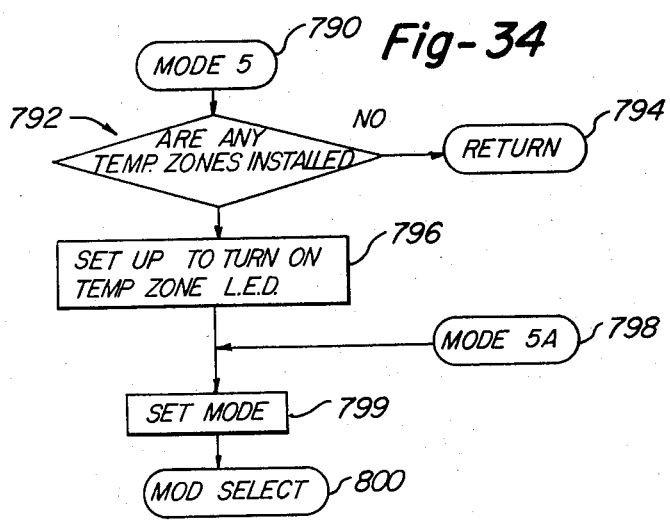

Referring now to FIG. 34, Mode 5 is entered at block 790 and proceeds to block 792, which looks to see if any temperature zones are installed. If no temperature zones are installed, the program proceeds to block 794, which returns to block 270, FIG. 5. If at block 792 some temperature zones are installed, block 796 sets up to turn on the temperature zone LED. The program then proceeds past block 798 to block 799, which calls the subroutine Setmode, which is entered at block 786, FIG. 33. Block 798 is entered from block 845, FIG. 39. Following the subroutine Setmode block 800 leads to block 658, FIG. 25.

DISPALL

Dispall converts data to arabic numbers in the displays.

Referring now to FIG. 35, Dispall is entered at block 801 and proceeds to block 802, which calculates the address of a 5 byte table in memory from the current mode number. This 5 byte table will contain all the current data for that particular mode to be displayed by the Interrupt Routine. The program proceeds to block 804, which transfers data from the 5 byte table to the memory locations which the Interrupt Routines will display and updates the AM/PM indicator 131 if the data is in the displays No. 1 and 2. If not data is in the displays 1 and 2, the AM/PM indicator 131 is cleared. Block 804 proceeds to block 806, which returns to block 780, FIG. 32.

MODE 6

Referring now to FIG. 36, Mode 6 is entered at block 808. Block 810 sets up to turn on the power set LED 152 and proceeds to block 811, which calls the subroutine called Setmode, which is shown in FIG. 33, block 786. Block 811 proceeds to block 812, which turns on the zone power LED. Block 814 then returns from the subroutine to the Super-visor.

MODE 7

Figure 37:
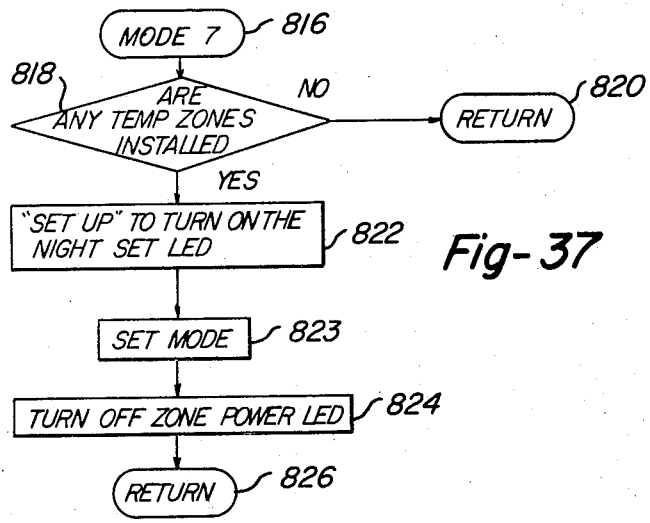

Referring now to FIG. 37, Mode 7 is entered at block 816. Block 818 looks to see if any temperature zones are installed. If they are not, the program returns at block 820. If temperature zones are indeed installed, the program proceeds to block 822, which sets up to turn on the Night Set Back LED 154. Block 822 proceeds to block 823, which calls the subroutine Set Mode. Block 824 then turns off the zone power LED. Block 826 then returns to block 270, FIG. 5.

MODE 8

Figure 38:
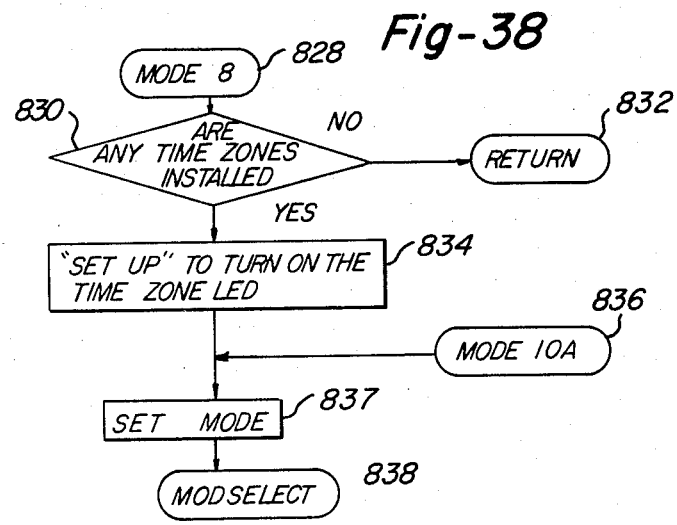

Referring now to FIG. 38, Mode 8 is entered at block 828 and proceeds to block 830, which checks to see if any time zones are installed. If not, the program proceeds to block 832, which returns to block 270. If some time zones are indeed installed, the program proceeds to block 834, which sets up to turn on the time zone LED 156. Proceeding past block 836, block 837 calls the subroutine Set Mode. The program proceeds to block 838, Modselct, block 658, FIG. 25.

MODE 9

Referring now to FIG. 39, Mode 9 is entered at block 839 and proceeds to block 840, which checks to see if any sprinkler zones are installed. If there are no sprinkler zones installed, the program proceeds to block 842, which returns. If there are sprinkler zones installed, block 844 sets up to turn on the Lawn Auto LED 158. Block 845 then leads to Mode 5A, block 798, FIG. 34.

MODE 10

Figure 40:
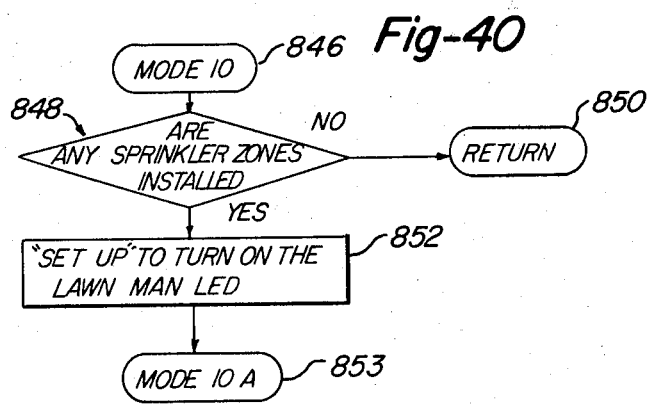

Referring now to FIG. 40, Mode 10 is entered at block 846 and proceeds to block 848, which checks to see if any sprinkler zones are installed. If there are none installed, the program proceeds to block 850, which returns. If there are sprinkler zones installed, block 848 proceeds to block 852, which sets up to turn on the manual lawn LED 160. Block 852 proceeds to block 853, which is mode 10A, block 836, FIG. 38.

MODE 11

Figure 41:
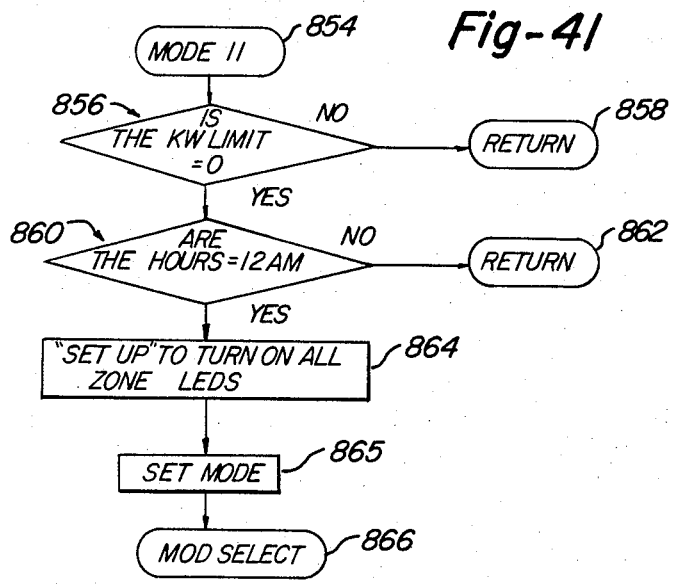

Referring now to FIG. 41, Mode 11 is entered at block 854 and proceeds to block 856, which checks to see if the manual kilowatt limit is equal to 0. If it is not, the program proceeds to block 858, which returns. If the manual kilowatt limit is indeed equal to 0, the program proceeds to block 860, which we check to see if the hours on the clock are equal to 12:00 a.m., which is 12:00 midnight. If not, block 860 proceeds to block 862, which returns. If the hours were indeed equal to 12:00 a.m., block 864 sets up to turn on all the zone LED's. Block 865 then calls the subroutine Set Mode. Block 865 proceeds to block 866, Modselct, block 658, FIG. 25.

SET CLOCK AND SET POWER

Figure 42:
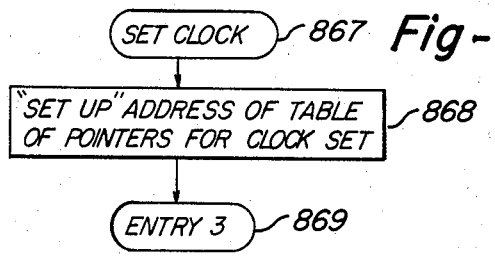

Referring now to FIG. 42, the Set Clock subroutine is entered at block 867 and proceeds to block 868, which sets up the address of the table of pointers for the clock set function. Block 868 proceeds to block 869, Entry 3, block 958, FIG. 48. Block 960 sets up the address of pointers using the key that is pressed and the table of pointers already set up. Block 960 then proceeds to block 961 which calls Entry 4 and jumps to block 962, Dontouch, which merely displays digits.

Figure 43:
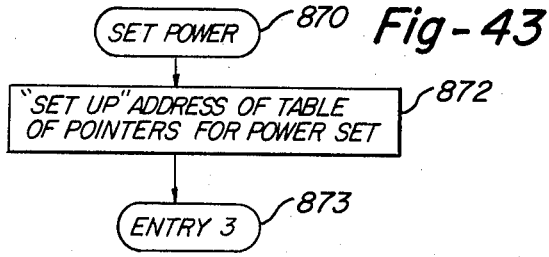

Now looking at FIG. 43, the Set Power subroutine is entered at block 870, which then proceeds to block 872, which sets up the address of table for the power set. Block 873 then leads to Entry 3.

SET TEMP

Referring to FIG. 44, Set Temp is entered at block 874. At block 876, the addresses of the table of pointers for the temperature set are set up. Block 878 then checks to see if any temperature zones are installed. If they are, block 880 sets the temperature mode flag. Block 880 proceeds to block 882, which checks to see if the key was equal to key 3. This is done so that if any key besides key 3 is pressed only one digit will be altered. But if key 3 was pressed in this function, other digits will be altered, such as the set temperature and the zone temperature. As the zone changes these digits must also change. If at block 882 the key number was not equal to 3, block 883 calls subroutine Entry 4, FIG. 51. Block 883 proceeds to block 884, which saves the new set temperature in its permanent location. Block 884 proceeds to block 885, which goes to Dontouch, block 768, FIG. 32.

If at block 882 the key was equal to key 3, block 886 calls the subroutine Zone Inc 1, FIG. 55. Zone Inc 1 essentially calls the subroutine Entry 4 and allows the zone number in display 3 to be altered, calculates the address of the data corresponding to that zone number, and gets that data. Block 886 proceeds to block 887, which displays the latest temperature in display 4 for the zone displayed in display 3. Block 888 then displays the set temperature in display 5. The program then proceeds past block 890 to block 892, where, depending upon the status of the displayed zone, the zone power LED is turned on or off. Block 893 then goes to Dontouch, block 768, FIG. 32.

Referring back to block 878, which checks to see if any temperature zones were installed, if they were not installed, block 879 goes to Mode 3, block 706, FIG. 29.

SET TIMED

Figure 45:
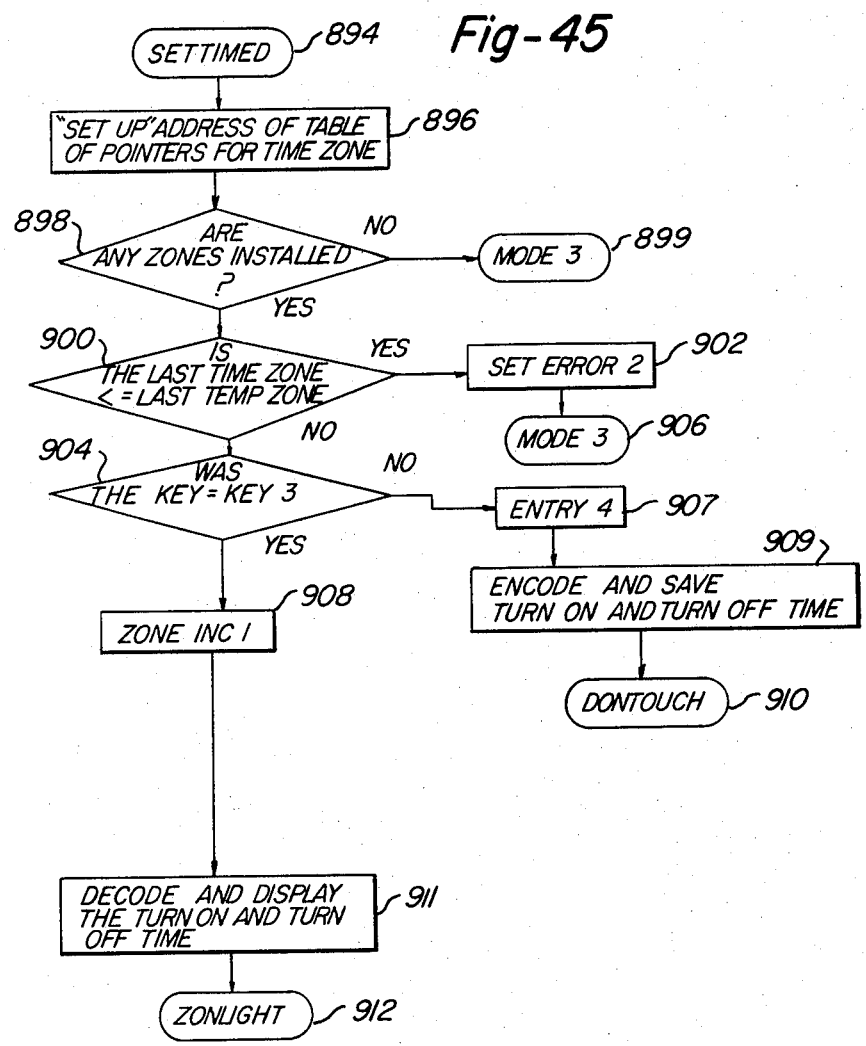

Referring now to FIG. 45, Set Timed is entered at block 894. Block 896 then sets up the address of the table of pointers for a timed zone. Block 898 then checks to see if any timed zones are installed. If no timed zones are installed, block 899 leads to Mode 3, FIG. 39. Referring back to block 898, if some timed zones are indeed installed, block 900 checks to see if the last timed zone is less than or equal to the last temperature zone. This is actually checking the options information put in by the installer or the C.E. If the timed zone is less than or equal to the last temperature zone, which would mean there is an error, and block 902 sets the error 2. Block 902 proceeds to block 906, which goes to Mode 3, FIG. 29. If the answer to block 900 is no, block 904 checks to see if the key pressed is equal to key 3. If the answer is no, block 907 calls the subroutine Entry 4, FIG. 51. Block 907 proceeds to block 909, which encodes and saves the turn on and turn off times in their permanent location. Block 910 then leads to Dontouch.

Referring back to block 904 which looks to see if the key was equal to 3, if the answer is yes, block 908 calls the subroutine Zone Inc 1, FIG. 55, which basically calls Entry 4, allows the digit in display 3 to be altered, and then calculates the address of the data corresponding to the zone number in display 3 and gets that data. From block 908, the program proceeds to block 911, which decodes and displays the turn on and turn off time. Block 912 then leads to Zonlight, block 890, FIG. 44.

SET AUTO

Figure 46:
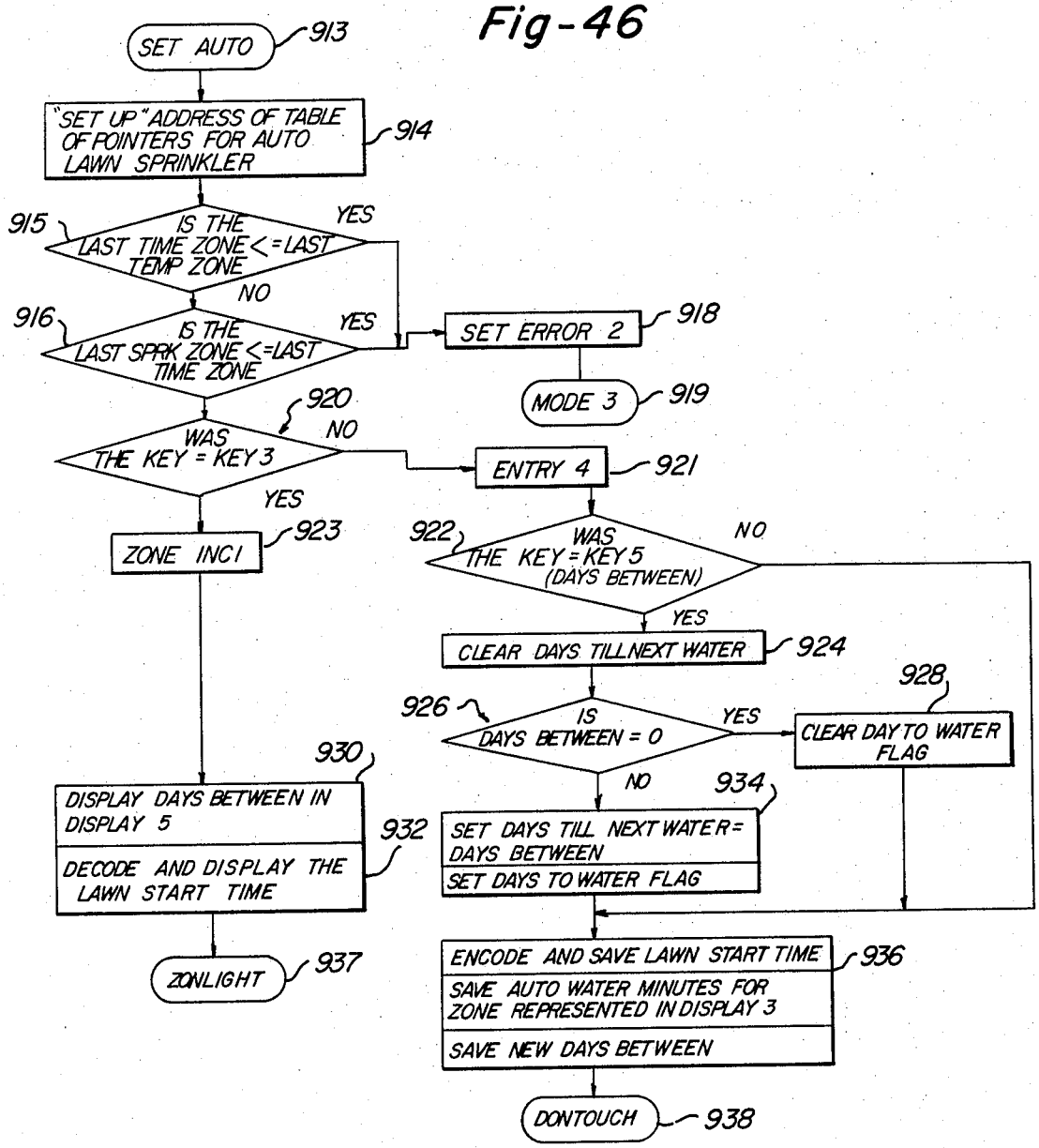

Referring now to FIG. 46, Set Auto is entered at block 913. Block 914 then sets up the address of the table of pointers for the automatic lawn sprinkler mode. Block 915 then checks to see if the last timed zone is greater than or equal to the last temperature zone. Again, this is to check to see that the data entered by the C.E. or the installer is correct. If the answer is yes, block 918 sets error 2 and then proceeds to block 919, where goes to Mode 3, FIG. 29.

Referring back to block 915, if the last timed zone is not less than or equal to the last temperature zone, block 916 checks to see if the last sprinkler zone is less than or equal to the last timed zone. Again, this is a check on the options information that the installer or the C.E. has entered. If the answer is yes, block 918 sets the error 2 and proceeds to block 919, Mode 3.

If, at block 916 the sprinkler zone was not less than or equal to the last timed zone, block 920 looks to see if the key pressed was equal to key 3. If it is not equal to key 3, block 921 calls Entry 4. Block 921 proceeds to block 922, which checks to see if the key was equal to key 5, which, in this function, is the days between. If it was indeed the days between function, block 924 clears the variable "days till next water" which determines when the next watering cycle will start. Block 924 proceeds to block 926, which checks to see if days between was equal to 0. If it is not equal to 0, block 934 sets the days till next water equal to the days between just entered and sets the day to water flag allowing it to water this day if the time has not already passed. The program then proceeds to block 936, which encodes and saves the lawn start time for the zone displayed in display 3; then saves the auto water minutes for the zone represented in display 3; and then saves the new days between. Block 938 leads to Dontouch, block 768, FIG. 32.

Referring back to block 922, if the key pressed was not equal to key 5 or days between, the program proceeds to block 936. Referring to block 926, which checks to see if days between was equal to 0, if it is indeed equal to 0, block 928 clears the day to water flag in block 928, which proceeds to block 936. Referring now to block 920, if the key pressed was key 3, block 923 calls the subroutine Zone Inc 1, FIG. 55. Then block 930 displays the days between in display No. 5. Block 932 then decodes and displays the lawn start time. Then block 937 leads to Zonlight, block 890, FIG. 44.

SET MANL

Figure 47:
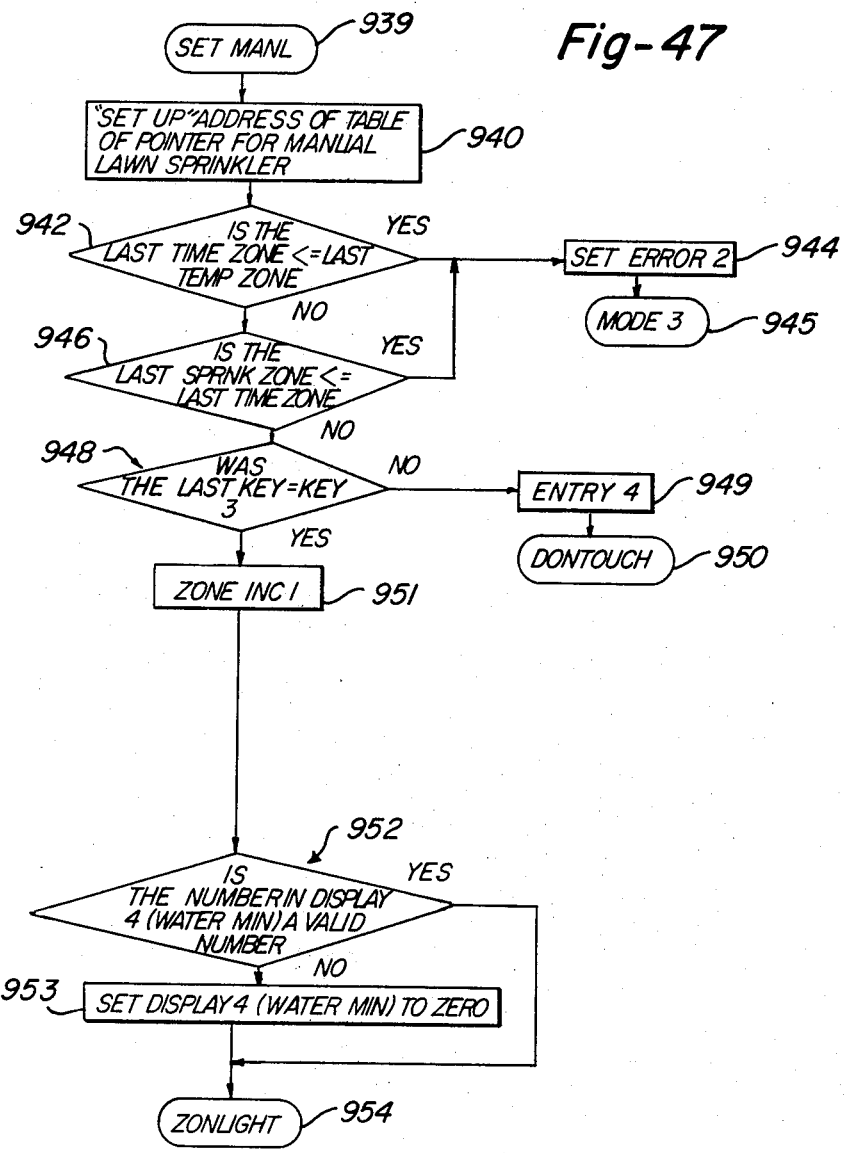

Referring now to FIG. 47, Set Manl is entered at block 939. Block 940 sets up the address of table of pointers for the manual sprinkler mode. Then block 942 checks to see if the last timed zone was less than or equal to the last temperature zone. If it is, then there is an error in the options bytes. Block 944 sets error 2 function and block 945 leads to Mode 3, FIG. 29. If at block 942 the last timed zone is not less than or equal to the last temperature zone, block 946 checks some more of the options bytes. It checks to see if the last sprinkler zone is less than or equal to the last timed zone. If it is, then the program goes to block 944. If it is not, block 948 checks to see if the key pressed was key 3. If it is not key 3, block 949 calls subroutine Entry 4 and proceeds to block 950, which leads to Dontouch, block 768, FIG. 32.

Referring back to block 948, if the key pressed was equal to key 3, block 951 calls subroutine Zone Inc 1 and then block 952 checks to see if the number in display four, which is water minutes, is a valid number. If it is not, block 953 sets display four, or water minutes, equal to 0. The program then proceeds to block 954, which goes to Zonlight, block 890, FIG. 44. If at block 952 the number in display four, or water minutes, is a valid number, the program proceeds to block 954, skipping block 953.

SET NIGHT

Figure 48:
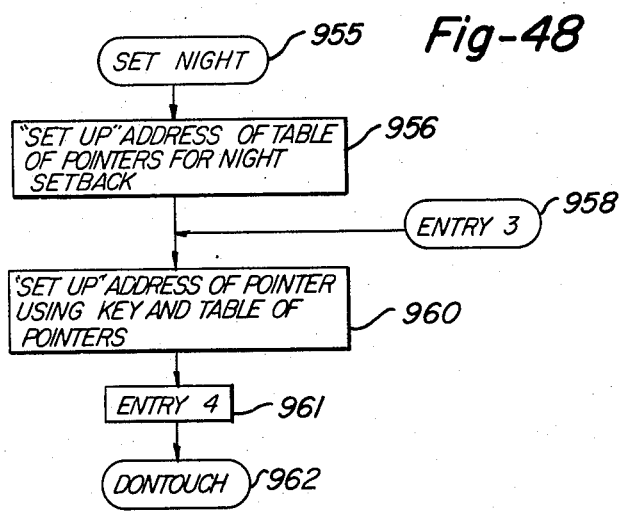

Referring now to FIG. 48, Set Night is entered at block 955. Block 956 sets up the address of the table of pointers for night setback. The program then proceeds past Entry 3, block 958, to block 960, which sets up the address of pointers using the key and a table of pointers. Block 961 then calls the subroutine Entry 4. Block 962 then leads to Dontouch.

As each function is entered, there is set up the address of a table of pointers. This is a table of five pointers. Each pointer points to a different table, the table being determined by the valid numbers for the function and the digit. Then, at Entry 3, block 958, there is set up the address of pointers within that previous table of pointers. It uses a key to determine which table is actually going to be used.

Entry 3 is entered from blocks 869, 873, FIGS. 42, 43, insuring that only valid numbers can be entered for Set Clock and Set Power.

EDITOR

Editor is used in the C.E. mode to enter data.

Figure 49:
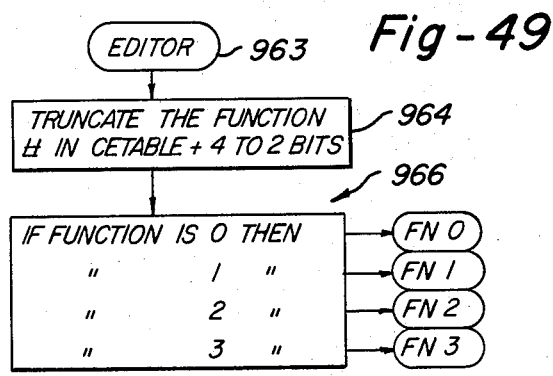

Referring now to FIG. 49, Editor is entered at block 963 from block 656, FIG. 24. Block 964 truncates the function number in the C.E. table digit 5 to only 2 bits, which allows the numbers 0, 1, 2 or 3. Then, depending upon that truncated function number, we proceed to function 0, 1, 2 or 3 which are represented in FIGS. 50, 52, 53, and 54.

FUNCTION 3

Function 3 is a lamp test.

Figure 50:
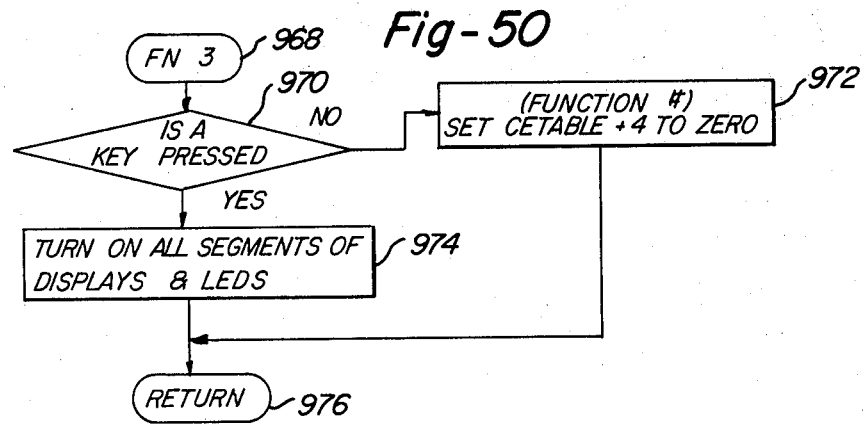

Referring now to FIG. 50, Function 3 is entered at block 968. Block 970 looks to see if a key is pressed. If a key is pressed, block 974 turns on all segments of all of the displays and turns on all of the LED's. The program then proceeds to block 976, which returns to the Supervisor, block 270. If at block 970 a key is not pressed, block 972 sets the function number in the display 136 to 0 and proceeds to block 976.

ENTRY 4

Entry 4 changes display digits from a table of displays.

Figure 51:
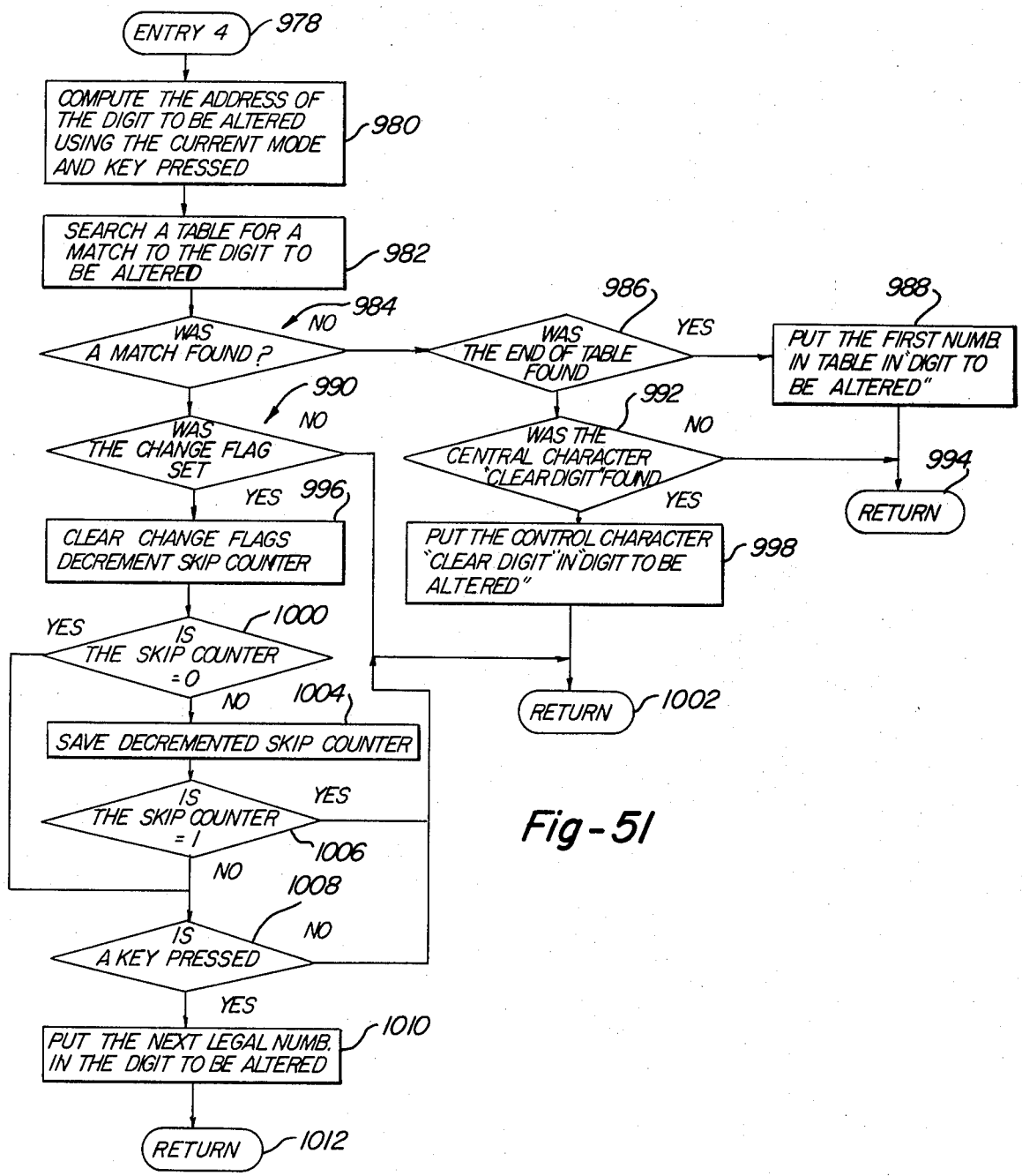

Referring now to FIG. 51, Entry 4 is entered at block 978. Block 980 then computes the address of the digit to be altered, using the present mode to determine the 5 Byte table address and the individual key being pressed to determine which of the 5 Bytes is going to be altered. Block 982 then searches a table for a match to the digit to be altered. Block 984 then checks to see if a match was indeed found. If the match was not found, the program proceeds to block 986, which checks to see if the end of the table was found. If an end of the table was indeed found, the program proceeds to block 988, which puts the first number in the table in the digit to be altered. The program then proceeds to block 994 which returns to block 909, FIG. 45.

If the end of the table was not found, block 986 then proceeds to block 992, which checks to see if the character found was a control character known as "clear digit". If it was not found, block 992 proceeds to block 994. If the control character clear digit was found at block 992, block 998 puts the control character clear digit in the digit to be altered, then proceeds to block 1002, then returns.

Referring back to block 984, if a match was found to the digit to be altered, block 990 checks to see if the change flag is set. If the change flag is not set, block 1002 returns. Referring back to block 990, if the change flag was indeed set, block 996 clears the change flags and decrement the skip counter. The purpose of the change flags are to determine the boundary on which a digit should be changed. This is a time function and usually happens on a one-quarter-of-a-second boundary. The purpose of the skip counter is to allow us to have the digit changed instantly upon the user having pushed a button and then wait, skipping the normal change digit function for one count then allowing it to return to its normal function of changing on a one-quarter-second boundary. This allows the user some reaction time to have him push the button and then allow him to remove his finger without having the digit change again before he was ready.

From block 996, block 1000 checks to see if the skip counter is 0. If it is not 0, the program goes to block 1004, which saves the decremented skip counter. Block 1004 proceeds to block 1006, which checks to see if the skip counter is equal to 1. In this condition, the digit would skip changing. If block 1006 is no, block 1008 checks to see if a key is pressed. If a key is being pressed, block 1010 puts the next legal number into the digit to be altered. The program then proceeds to block 1012 which returns.

Referring back to block 1000, if the skip counter is equal to 0, the program proceeds to block 1008. In block 1006, if the skip counter was equal to 1, being that it was time to skip, the program proceeds to block 1002, which returns.

FUNCTION 0

Function 0 is used to change external memory.

Figure 52:
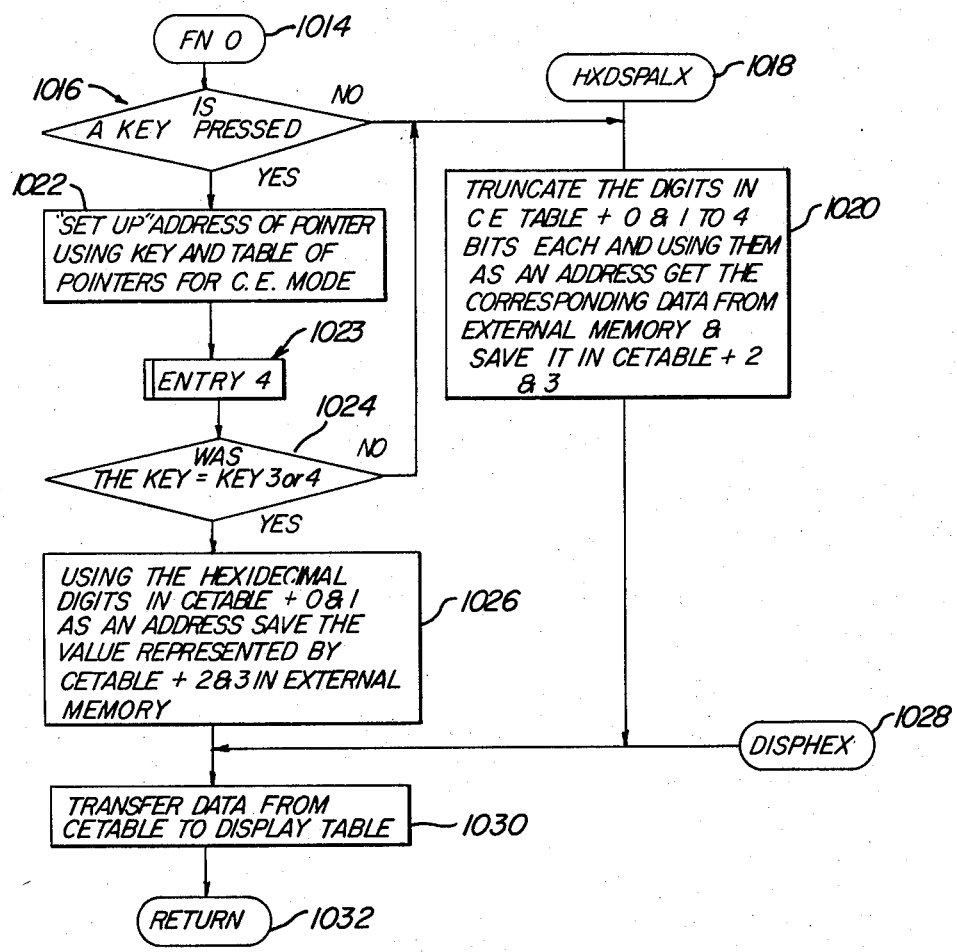

Referring now to FIG. 52, Function 0 is entered at block 1014. Block 1016 checks to see if a key is pressed. If a key is being pressed, block 1022 sets up an address of pointer to a table using a key and a table of pointers for the C.E. mode. Block 1023 then calls the subroutine Entry 4, FIG. 51. Block 1023 proceeds to block 1024 which checks to see if the key was key 3 or key 4. If it was key 3 or key 4, block 1026, using the hexadecimal digits and displays 0 and 1 as an address, saves the value represented by the digits 3 and 4 in external memory. Block 1026 proceeds past block 1028 to block 1030, which transfers data from the C.E. table to the display table. Block 1030 proceeds to block 1032, which returns to block 270, FIG. 5.

Referring back to block 1016, if a key is not pressed, block 1020 truncates the first two digits in the C.E. table to 4 bits each and, using them as an address, gets the corresponding data from external memory and splits this up into two hexadecimal digits, and puts it into the C.E. table digits 3 and 4. Block 1020 then proceeds to block 1028 which corresponds to block 1047, FIG. 53. Block 1028 proceeds to block 1030.

FUNCTION 1

Function 1 is used to change internal memory.

Figure 53:
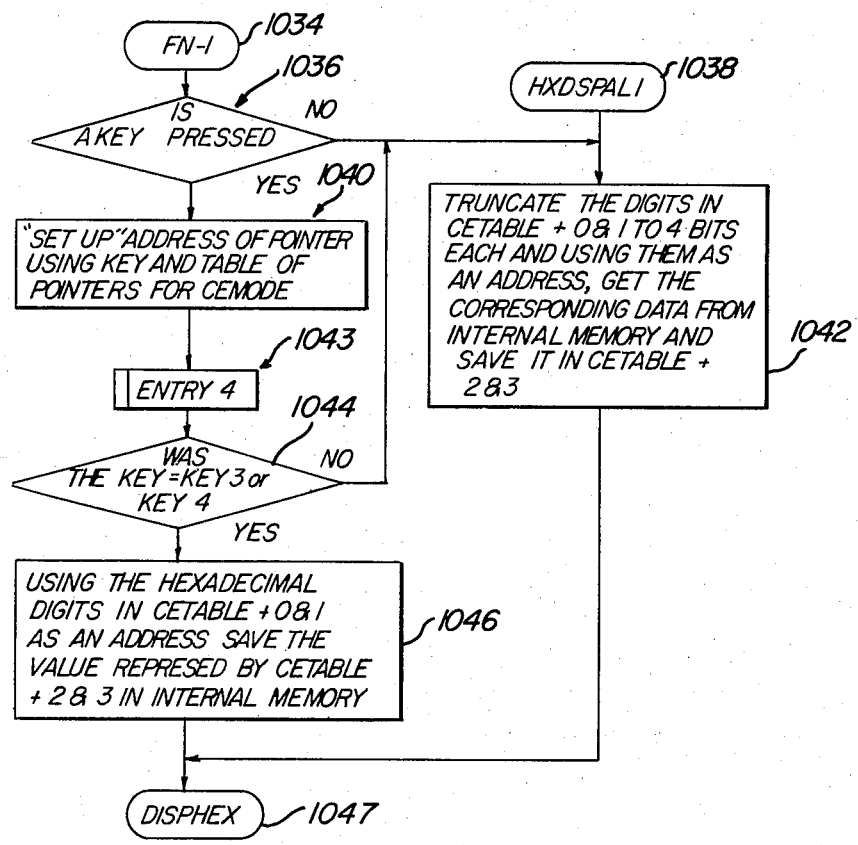

Referring now to FIG. 53, Function 1 is entered at block 1034, which proceeds to block 1036, which checks to see if a key is pressed. If a key is pressed, block 1040 sets up the address of a pointer to a table, using the key and the table of pointers assigned for C.E. mode. Block 1043 then calls the subroutine Entry 4. Then, block 1044 checks to see if the key was equal to key 3 or key 4. If it was key 3 or key 4, block 1046 using the hexadecimal digits in displays 1 and 2 as an address saves the value represented by the hexadecimal digits in displays 3 and 4. Block 1046 proceeds to block 1047, which leads to Disphex, block 1028, FIG. 52.

Referring back to block 1036, if a key is not pressed, block 1042 truncates the digits in displays 1 and 2 to 4 bits each and, using them as an address, gets the corresponding data from internal memory and saves it in displays 3 and 4. Block 1042 proceeds to block 1047.

FUNCTION 2

Function 2 turns sensors and zone power on and off for testing.

Figure 54:
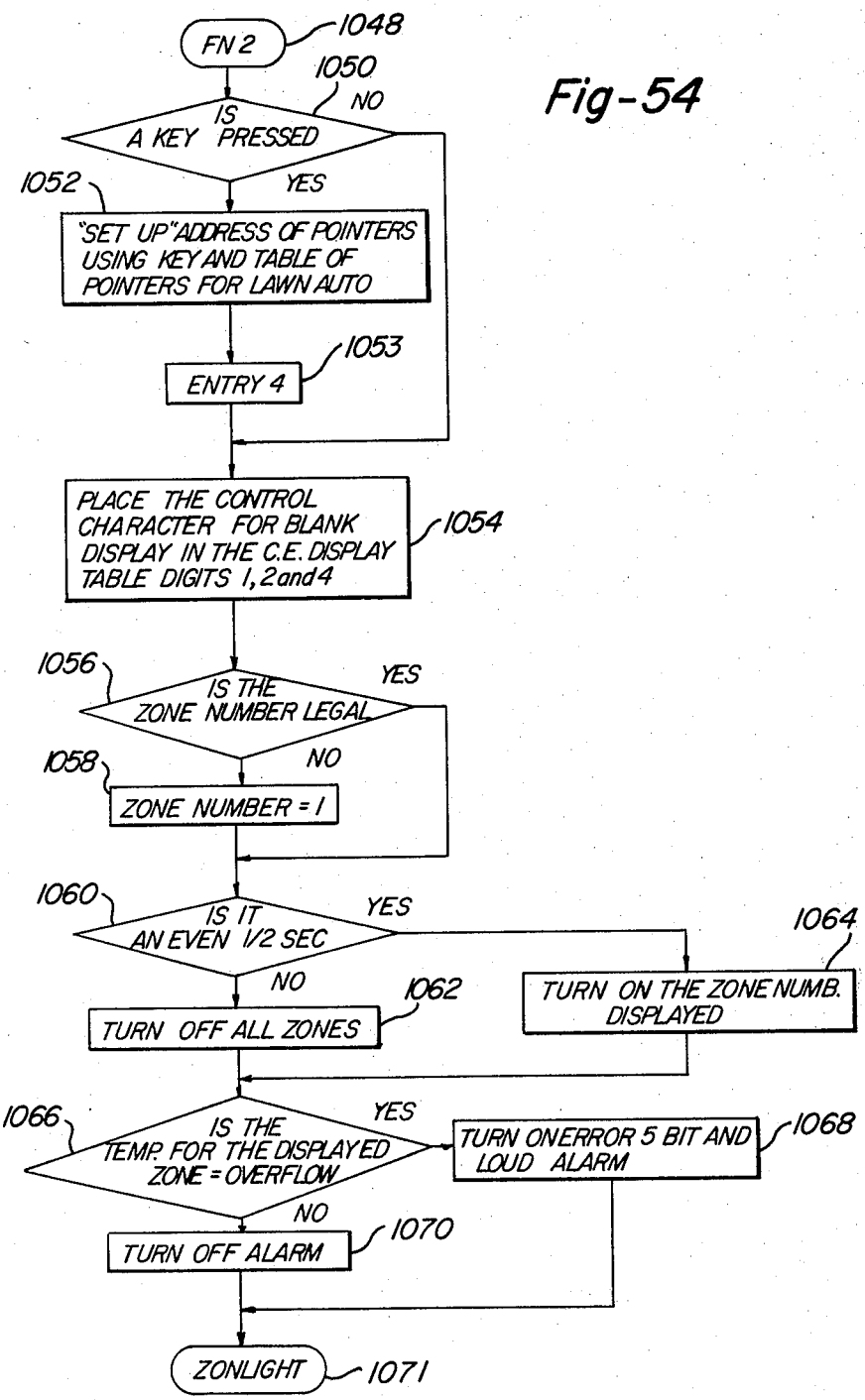

Referring to FIG. 54, Function 2 is entered at block 1048. Block 1050 checks to see if a key is pressed. If a key is indeed pressed, block 1052, using a table of pointers for the Lawn Auto mode and the value of the key, determines the address of a pointer to a table. Block 1053 then calls the subroutine Entry 4.

Proceeding on, block 1054 places a control character in displays 1, 2 and 4 to blank these displays. Block 1056 then checks to see if the number in display 3 is in the range of 1-24 (legal zone numbers). If not, block 1058 places the number "one" in display 3. If the zone number was legal at block 1056, the program skips around block 1058 to block 1060, which checks to see if it is an even half second. If not, all zones are turned off at block 1062. If it is an even half second, the zone number displayed in display 3 is turned on in block 1064. Block 1066 then checks the temperature of the displayed zone. If the temperature is equal to an overflow condition, block 1068 turns on the error 5 flag and turns on the loud alarm. If the temperature for the displayed zone is not an overflow condition, block 1040 turns off the alarm. Block 1071 then leads to the routine labeled Zonlight, block 890, FIG. 44.

Referring back to block 1050, if a key is not pressed, the program proceeds to block 1054.

ZONE INC 1

Zone Inc 1 calculates the address of data in display 4 corresponding to display 3.

Referring now to FIG. 7, Zone Inc 1 is entered at block 1072, which proceeds to block 1073, which is the subroutine Entry 4. Block 1074 then checks to see if the digit in display 3 is greater than the last zone of this mode. If it is greater than the last zone of this mode, block 1076 puts the first zone number allowed into display digit number three. Block 1078 then calculates the address of the data corresponding to the zone number in display three and gets that data. Block 1078 proceeds to block 1080, which returns to block 952, FIG. 47.

Referring back to block 1074, if the digit in display three is not greater than the last allowed zone of this mode, the program proceeds past block 1076 to block 1078.

What is claimed is:

1. Power consumption controlling apparatus for use in a facility having a plurality of power consuming loads in various zones, including thermostatically controlled electrically operated space heating devices in some of the zones and electrically operated appliance devices in other of said zones, and comprising:

a power sensing circuit means associated with the main power line to the facility for continuously generating signals representative of total electrical power consumption by electrically operated devices in the facility;

a computer means connected to said power sensing circuit means for receiving said signals and comparing said signals with a predetermined maximum power demand limit set in said computer means;

keyboard means for entering data into the computer, said data including said predetermined maximum power demand limit and an initially selected maximum temperature level for each of a plurality of said electrically operated space heating devices;

an on-off heater control relay means connected to each of the electrically operated space heating devices for controlling the on-off state thereof;

temperature sensors, connected to the computer, for sensing temperature levels in each of the various zones so that said computer may compare each temperature level with a corresponding one of said initial selected maximum temperature levels to actuate said on-off heater control relay means when temperature levels are below said maximum temperature levels except when power consumption exceeds said power demand limit;

an on-off relay means connected to each of the plurality of the electrically operated appliance devices and turned on, to deliver power thereto or turned off by said computer;

a temperature level setting control means in the computer operably associated with each of the on-off heater control relays means for automatically incrementally increasing and decreasing the temperature level setting therefor;

said computer controlling said temperature control means to maintain said initial selected maximum temperature levels except when power consumption exceeds said power demand limit; and said computer incrementally reducing said initial maximum temperature levels to a plurality of reduced temperature levels a preselected amount below said initial maximum temperature levels while power consumption exceeds said power demand limit.

2. The apparatus of claim 1 wherein said computer selecting one of said plurality of reduced temperature levels on the basis of time over said power demand limit.

3. The apparatus of claim 2 wherein said computer calculates an automatic power demand limit and maintains said preselected reduced temperature levels according to said automatic power demand limit.

4. The apparatus of claim 1 wherein said computer controls said keyboard means to provide a menu of data from which a user selects data to be entered and further comprising:

a display for displaying said menu and for displaying user selected data.

5. The apparatus of claim 1 wherein one of the electrically operated devices comprise:

a hot water heater which is maintained at a preselected level below its external power setting through computer control of one of said relays prior to said reducing of other output levels.

6. Power consumption controlling apparatus for use in a system including a plurality of electrically operable load devices and utilizing a power sensing circuit for continuously measuring total power consumption and a plurality of relays for controlling the amount of power individually consumed by the plurality of load devices, comprising:

a computer for continuously receiving data input from said power sensing circuit representative of total power consumption and for outputting signals to control said relays and reduce total power consumption whenever total power consumption exceeds a predetermined maximum value by selectively reducing power being consumed by the load devices, said signals being dependent on variables including at least one user selected value and including data input from said power sensing circuit and data input relating to the output levels of the load devices;

keyboard means, connected to said computer, for inputting said user selected value to said computer;

display means for displaying said user selected value and data input from said power sensing circuit and data input relating to the output levels of the load devices; and said computer monitoring the input data from said keyboard means and controlling said display means according to a plurality of preselected values which are sequentially displayed on said display means, so that said keyboard means permits said user selected value to be one of the plurality of preselected values which are sequentially displayed on said display means.

7. The apparatus of claim 6 wherein said computer further comprises:

memory means for storing said data input from said power sensing circuit;

means for automatically calculating said predetermined maximum power consumption value from stored data input; and said predetermined maximum power consumption value being dependent on said variables.

8. The apparatus of claim 6 or 7 further comprising:

inputs to said computer for sensing temperatures in a number of heating zones which are heated by load devices individually controlled by an equal number of relays.

9. The apparatus of claim 8 wherein said variables include a user selected value representative of a temperature setting for each of said heating zones.

10. The apparatus of claim 6 further comprising:
a real time clock, said real time clock controlling at least one of the load devices 11. The apparatus of claim 6 wherein said keyboard means comprises:
mode keys for selecting one of a plurality of preselected modes, including a mode for selecting said user selected value; and
cycling keys for cycling through said preselected values for a mode selected by the mode keys.

12. A method of controlling power consumption in a facility having a plurality of power consuming loads in various zones, comprising the steps of:
(a) setting a predetermined initial maximum output level and a plurality of more limited lower maximum output levels for a plurality of the power consuming loads;
(b) continuously measuring total power consumption by all power consuming loads in the facility to obtain a total power consumption value;
(c) comparing said power consumption value with a power demand limit value to determine if power consumption is above the power demand limit value;
(d) if so, limiting power to one of said loads and recomparing the total power consumption value with the power demand limit value;
(e) if the power consumption value exceeds the power demand limit value after step (d) is carried out, sequentially lowering the initial maximum output level of other ones of said loads to the limited lower maximum output levels; and
(f) continuing to sequentially lower the output level of the other ones of said loads to the limited lower maximum output levels until total power consumption is less than the power demand limit value.

13. The method of claim 12 further comprising the steps of:
sensing the output level of the loads of paragraphs (e) and (f) of claim 12; and
maintaining said output level at said initial maximum output level when the total power consumption value is below the power demand limit value.

14. The method of claim 13 further comprising the step of:
sounding an alarm if the output level of any load is above said initial maximum output level.

15. The method of claim 12 further comprising the step of:
averaging the total power consumption value over a predetermined time period to obtain an average power consumption value; and
comparing said average power consumption value with said power demand limit value to establish a new power demand limit value.

16. The method of claim 15 further comprising the steps of:
saving said average power consumption value;
calculating an automatic power demand limit value based on said average power consumption value; and
utilizing said automatic power demand limit value as said power demand limit value in steps (b)-(f).

17. The method of claim 15 further comprising the steps of:
setting said limited maximum output level at a first limited maximum output level below said initial maximum output level in steps (e) and (f);
repeating steps (b)-(d); then if power consumption exceeds the power demand limit value after step (c) is repeated, lowering said first maximum output level to a second maximum output level; and
stopping power consumption of loads having output levels above said second limited maximum output level.

18. An electrical power control system for automatically reducing the total electrical power used in a facility by a plurality of electric operated devices whenever total electrical power usage by the devices exceeds a predetermined maximum power usage level and for thereafter automatically monitoring the amount of reduced available power used and for controlling the amount of reduced available power used by each device in accordance with a preselected priority schedule of usage of reduced available power, the control system being adapted to be associated with a conventional electrical power supply system including:
a main source of power for operating all such devices;
a meter means for measuring the total amount of power being used by all such devices;
a plurality of power transmission circuit means connected to such devices for transmitting power thereto;
circuit breaker means operatively associated with said circuit means for preventing transmission of current to such devices whenever the current level to any one such device exceeds a predetermined maximum current level; and the control system comprising:
current sensing means associated with the main source of power for continuously determining the total amount of power being used by all of the electric power operated devices and for providing power usage level output signals representative thereof;
data storage means for receiving and averaging said power level usage output signals and providing a total power usage output signal representative of the total amount of power being used by all devices;
comparator means for producing a predetermined maximum power usage signal and comparing said total power usage signal therewith and generating power level usage control signals;
power usage level control means operatively associated with each device for receiving said power level usage control signals and for automatically reducing and increasing power available to each associated device such that the total power usage by all devices does not exceed a predetermined maximum total power usage;
reduced power usage monitoring means being effective after reduction of total power usage of the devices for repeatedly determining the amount of reduced power being used by the devices and for providing reduced power output signals representative of the amount of reduced power being used by the devices;
reduced power level control means operable by said reduced power output signals for continuously varying the amount of reduced total power available to the devices in accordance with a predetermined schedule of priority of usage by each device of reduced total power available for the system.

19. The invention as defined in claim 18 and further comprising:
calculator means for periodically calculating total power usage over a predetermined time period and adjusting the predetermined maximum power usage signal for a predetermined succeeding time period.

20. The invention as defined in claim 18 and wherein the plurality of electric power operated devices includes a plurality of electric operated space heating units located within different heating zones in the facility and further comprising:
thermostatic control means operatively associated with each of the space heating units for controlling the on-off state thereof;
temperature sensor means in each of the heating zones for generating signals representative of the temperature therein;
thermostat setting adjustment means operatively associated with said power usage control means, for automatically adjusting the temperature setting of said thermostatic control means in accordance with said power level usage control signals to reduce the temperature settings until the total power usage by all devices including the space heating units does not exceed the predetermined maximum total power usage.

21. The invention as defined in claim 20 and wherein:
said thermostat setting adjustment means being operatively associated with said reduced power usage monitoring means and constructed and arranged for incrementally reducing the temperature settings of said thermostatic control means.

22. The invention as defined in claim 21 and wherein the temperature settings of said thermostatic control means are reduced by increments of approximately $\frac{1}{2}°$ or less.

23. The invention as defined in claim 21 wherein one of the plurality of electric power operated devices is a hot water device and further comprising:
a hot water control means for alternately turning the hot water device off and on for predetermined periods of time until the total power usage by all devices does not exceed the predetermined maximum total power usage.

24. The invention as defined in claim 23 and wherein:
said hot water control means being constructed and arranged to be operative prior to said thermostat setting adjustment means.

25. The invention as defined in any of claims 18, 19, 20, 21, 22, 23, or 24 and wherein all of the control means and all of the adjustment means are included in a micro computer device having a data display means and a user data entry means associated with each of the electric power operated devices for enabling the user to monitor and input data to the system to change the desired controlled output level of each device.

26. A continuously operable power usage control system for automatically limiting the amount of power used in a facility by a plurality of electrically operable devices, including a plurality of thermostatically controlled air conditioning devices located in separate zones in the facility and comprising:
total power usage measuring means for measuring total power usage by all the electrically operable devices and for generating total power usage signals representative of total power usage by all the electrically operable devices;
on-off control means operatively associated with each of the electrically operable devices for energizing and de-energizing the electrically operable devices;
a computer means operatively associated with said total power usage measuring means and said on-off control means for receiving the total power usage signals from said total power usage measuring means and for controlling the on-off state of said on-off control means;
a maximum total power usage setting means in said computer means for setting a maximum allowable total power usage value;
temperature sensor means in each of the separate zones and being connected to said computer means for generating temperature level signals and transmitting the temperature level signals to said computer means;
thermostatic control means in said computer means for receiving the temperature level signals and for actuating said on-off control means which are associated with the thermostatically controlled air conditioning devices when the temperature level signals indicate a temperature level in a separate zone which differs from a temperature level setting for the separate zone in said thermostatic control means;
manually operable temperature level setting means operatively associated with said thermostatic control means in said computer means for selectively manually setting desired temperature levels in the separate zones;
automatically operable temperature level setting means in said computer means for automatically changing the selectively manually set desired temperature levels in the separate zones;
comparison means in said computer means for comparing total power usage signals with the maximum allowable total power usage value and generating control signals for actuating said automatically operable temperature level setting means when total power usage by the devices exceeds the maximum allowable total power usage value whereby the selectively manually set desired temperature levels are changed to computer set temperature levels to prevent energization of the thermostatically controlled air conditioning devices until total power usage by the devices is less than the maximum allowable total power usage value.

27. The invention as defined in claim 26 and further comprising:
timer means in said computer means for controlling operation of said comparison means and causing repeated comparison of the maximum allowable total power usage value with the total power usage signals at predetermined time intervals to produce a continuing series of control signals; and
computer set temperature level change stepping means in said computer means for sequentially incrementally changing the computer set temperature levels away from the preselected manually set temperature level by predetermined incremental amounts until the maximum allowable power usage value is less than the total power usage by the devices and for reversely sequentially incrementally changing the computer set temperature levels toward the preselected manually set temperature levels without permitting the total power usage by the devices to exceed the maximum allowable power usage value.

28. The invention as defined in claim 27 and wherein:
said timer means being constructed and arranged to provide the continuing series of control signals at time intervals on the order of approximately every two seconds; and
said computer set temperature level change stepping means being constructed and arranged to change the computer set temperature levels by increments on the order of approximately $\frac{1}{2}°$ F. or less.

29. The invention as defined in claim 28 and wherein: one of the devices is a hot water heating device operably associated with one of said on-off control means which is operable by said computer means to prevent energization of said hot water heating device for a predetermined period of time after the total power usage by the devices exceeds the maximum allowable power usage value.

30. The invention as defined in claim 28 and wherein:
the air-conditioning devices are space heating devices; and
said manually operable temperature level setting means is constructed and arranged for manually setting a maximum temperature level and a minimum temperature level for each separate zone; and
computer set temperature level limiting means in said computer means for preventing reduction in computer set temperature levels below the manually set minimum temperature level for each separate zone.

* * * * *

UNITED STATES PATENT AND TRADEMARK OFFICE
CERTIFICATE OF CORRECTION

PATENT NO. : 4,370,723

DATED : January 25, 1983

INVENTOR(S) : Stanley S. Huffman, Alan F. Neel, Christopher A. Swartout and Neil E. Dvorak It is certified that error appears in the above-identified patent and that said Letters Patent are hereby corrected as shown below:

Column 2, line 19, insert -- a -- after "and" and delete "a" after "selected".

Column 17, line 16, "an" should read -- and --.

Column 23, line 22, "time" should read -- times --.

Column 33, line 8, (CLAIM 10) after "devices" insert -- according to an on time and an off time, entered by the user through said keyboard means. --

Signed and Sealed this

Twenty-sixth Day of April 1983

[SEAL]

Attest:

GERALD J. MOSSINGHOFF

Attesting Officer     Commissioner of Patents and Trademarks